United States Patent
Schreiber et al.

(10) Patent No.: US 6,298,446 B1
(45) Date of Patent: Oct. 2, 2001

(54) METHOD AND SYSTEM FOR COPYRIGHT PROTECTION OF DIGITAL IMAGES TRANSMITTED OVER NETWORKS

(75) Inventors: Daniel Schreiber; Andrew Goldman, both of Beit Shemesh (IL)

(73) Assignee: Alchemedia Ltd. (IL)

( * ) Notice: Subject to any disclaimer, the term of this patent is extended or adjusted under 35 U.S.C. 154(b) by 0 days.

(21) Appl. No.: 09/397,331

(22) Filed: Sep. 14, 1999

Related U.S. Application Data

(63) Continuation-in-part of application No. 09/313,067, filed on May 17, 1999.

(51) Int. Cl.[7] ............................................ G06F 11/00
(52) U.S. Cl. ................................... 713/201; 713/200
(58) Field of Search .................................. 713/200, 201

(56) References Cited

U.S. PATENT DOCUMENTS

| | | |
|---|---|---|
| 4,405,829 | 9/1983 | Rivest et al. . |
| 4,827,508 | 5/1989 | Shear . |
| 4,977,594 | 12/1990 | Shear . |
| 5,050,213 | 9/1991 | Shear . |
| 5,303,370 | 4/1994 | Brosh et al. . |
| 5,410,598 | 4/1995 | Shear . |
| 5,509,070 | 4/1996 | Schull . |
| 5,533,124 | 7/1996 | Smith et al. . |
| 5,636,292 | 6/1997 | Rhoads . |
| 5,638,513 | 6/1997 | Anada . |
| 5,710,834 | 1/1998 | Rhoads . |
| 5,715,403 | 2/1998 | Stefik . |
| 5,721,788 | 2/1998 | Powell et al. . |
| 5,745,604 | 4/1998 | Rhoads . |
| 5,748,763 | 5/1998 | Rhoads . |
| 5,748,783 | 5/1998 | Rhoads . |
| 5,758,068 | 5/1998 | Brandt et al. . |
| 5,765,152 | 6/1998 | Erickson . |
| 5,768,426 | 6/1998 | Rhoads . |
| 5,801,679 | 9/1998 | McCain . |

(List continued on next page.)

OTHER PUBLICATIONS

Chapter 3—Understanding Image Guardian—3 pages.
Chapter 3—Understanding Web Referee—3 pages.
"Copysight", http://www.ip2.com.
"Copysight: Now You Can Protect Your Website Content on the Internet with Copysight's Suite of Software and Business Solutions", (http://www.ip2.com), 1999.
Digimarc & Copyright Protection (http://www.digimarc.com), 1999.
"Digital Rights Management" http://www.intertrust.com.
"SafeImage", http://www.safemedia.com.
"SiteShield" press release, http://www.maximized.com/press/960529-1.html.
"SiteShield" product details, http://www.maximized.com/products/siteshield/why.html.
"Softlock.Com". http://www.softlock.com.
Strom, D., "Browser: Protect Your Image on the Web", 1998 (http://www.zdnet.com).

*Primary Examiner*—Robert Beausoleil
*Assistant Examiner*—Bryce P. Bonzo
(74) *Attorney, Agent, or Firm*—Fenwick & West LLP

(57) ABSTRACT

A method for protecting digital images distributed over a network, including the steps of receiving a request from a client computer running a network browser, for an original layout page containing references to digital images therein, parsing the original layout page for the references to digital images, generating a modified layout page from the original layout page by replacing at least one of the references to digital images in the original layout page with references to substitute data, and sending the modified layout page to the client computer. A system is also described and claimed.

12 Claims, 14 Drawing Sheets

U.S. PATENT DOCUMENTS

| | | |
|---|---|---|
| 5,809,160 | 9/1998 | Powell et al. . |
| 5,822,436 | 10/1998 | Rhoads . |
| 5,832,119 | 11/1998 | Rhoads . |
| 5,835,722 | 11/1998 | Bradshaw et al. . |
| 5,838,902 | 11/1998 | Shin . |
| 5,841,886 | 11/1998 | Rhoads . |
| 5,841,978 | 11/1998 | Rhoads . |
| 5,850,481 | 12/1998 | Rhoads . |
| 5,862,260 | 1/1999 | Rhoads . |
| 5,870,544 | 2/1999 | Curtis . |
| 5,872,915 | 2/1999 | Dykes et al. . |
| 5,881,287 * | 3/1999 | Mast ........................................ 717/1 |
| 5,892,900 | 4/1999 | Ginter et al. . |
| 5,905,505 | 5/1999 | Lesk . |
| 5,982,931 | 11/1999 | Ishimaru . |
| 5,991,399 | 11/1999 | Graunke et al. . |
| 6,011,905 | 1/2000 | Huttenlocher et al. . |
| 6,014,702 | 1/2000 | King et al. . |
| 6,032,150 | 2/2000 | Nguyen . |

\* cited by examiner

METHOD AND SYSTEM FOR COPYRIGHT PROTECTION OF DIGITAL IMAGES TRANSMITTED OVER NETWORKS

This application is a continuation-in-part of assignee's pending application U.S. Ser. No. 09/313,067, filed on May 17, 1999, entitled "Methods and Apparatus for Preventing Reuse of Text, Images and Software Transmitted via Networks."

FIELD OF THE INVENTION

The present invention relates to copyright protection of digital data.

BACKGROUND OF THE INVENTION

Software copyright protection is a central concern in software development, and in copyright law itself. Typically, software is distributed in shrink-wrap packages containing diskettes and/or CD-ROMs, and over the Internet via ftp servers. Protecting software from rampant unauthorized copying, distribution and use ("software piracy") is one of the most challenging problems facing the software industry.

Over the past years, several techniques have been developed 1or combating software piracy. These include use of hardware plugs, use of license keys, use of tokens and sophisticated encryption systems.

One of the leading technologies for controlling use of software within turnkey transaction systems is the Digital Rights Management system of InterTrust® Technologies Corp. of Sunnyvale, Calif., as described in U.S. Pat. Nos. 5,892,900, 5,410,598, 5,050,213, 4,977,594 and 4,827,508. Information about InterTrust is available on the web at http://www.intertrust.com.

Another such leading technology is the CyberSales Solution™ of SoftLock.com, Inc. of Maynard, Mass., as described in U.S. Pat. No. 5,509,070. CyberSales Solution provides locking and unlocking functionality so that content can be securely previewed by consumers, electronically purchased and redistributed, and it protects the content in an initial transaction and in subsequent information pass-along. Content providers can control how much information is available without paying, and disable, or additionally charge for, the ability to print or cut and paste. CyberSales Solution handles secure transactions, remittance processing, reports, audits and customer service. Information about CyberSales Solution is available on the web at http://www.softlock.com.

With the advent of the use of compelling multi-media on web pages accessible over the Internet, protection of digital images and other media is becoming increasingly critical. Web designers are reluctant to use valuable digital "works of art" knowing that users can easily copy them onto their own computers, and use them for their own unauthorized purposes. Moreover, anyone using a web browser to view an image posted on the Internet can easily copy the image by simply positioning a mouse pointer over the displayed image, clicking on the right mouse button and selecting a "Save Image As . . ." command. Copyright and piracy issues are major problems for web publishers.

Prior art techniques for protecting digital images include the embedding of invisible digital watermarks within images, so that copies of protected images can be traced. Digimarc Corporation of Lake Oswego, OR embeds hidden messages within pixel data for identifying protected images, and tracks their distribution over the Internet to monitor potential copyright infringement. Digimarc images carry unique IDs that link to predetermined locations on the web. Digimarc images are compatible with standard image formats, such as JPEG, and can be opened and displayed by standard image readers. However, when opened with a Digimarc reader, the images are displayed together with a "Web look up" button that enables a user to identify the sources of the images. Digimarc technology is described in U.S. Pat. Nos. 5,862,260, 5,850,481, 5,841,978, 5,841,886, 5,832,119, 5,822,436, 5,809,160, 5,768,426, 5,765,152, 5,748,783, 5,748,763, 5,745,604, 5,721,788, 5,710,834 and 5,636,292. Information about Digimarc is available on the web at http://www.digimarc.com.

These techniques are useful in thwarting digital image piracy to the extent that they trace pirated content, but they do not prevent unauthorized copying of digital images in the first place.

Other prior art techniques require a webmaster to modify images residing on a server computer in order to protect them. The webmaster is also required to modify his web pages accordingly, so as to reference the modified images. SafeMedia™ is a software product of Internet Expression, Inc. of Exton, Pa. that converts images from a standard format such as JPEG into SIF (Safe Image Format). SIF images can only be viewed with a SafeMedia Java viewer. SafeMedia embeds a host or domain name into an image, and checks that the image is located on the web site it was intended for. SafeMedia also includes enhanced system control for preventing screen capture by disabling a clipboard. Information about SafeMedia is available on the web at http://www.safemedia.com.

These techniques are difficult to embrace, since they require modification of all protected images on the web, as well as modification of the web pages that reference them. Furthermore the SIF Java viewer has the limitation of only being able to load images from the same server that the viewer came from.

Other prior art techniques for protecting digital images use Java applets within web browsers to disable the menu that pops up when a user right clicks on a displayed image within his web browser. Copysight® is a software application of Intellectual Protocols, LLC of Nanuet, N.Y. that uses digital watermarking and fingerprinting to protect images, and includes a Java applet that disables the ability to save displayed images within a web browser and the ability to print them. Copysight operates by converting unprotected files to protected files that are encrypted and that contain digital fingerprints. Copysight also tracks distribution of protected images across the Internet, and issues reports of potential copyright infringement. It allows a web administrator to select which files are to be protected. Information about Copysight is available on the web at http://www.ip2.com.

These techniques disable unauthorized copying of digital images from within web browsers, but they do not protect the images from being copied by an application external to the web browser. For example, they do not prevent a user from copying digital images displayed in his web browser by means of an application running external to the web browser, such as an image editing tool, or by means of a Print Screen or other such command that serves to copy contents of a video buffer to a clipboard. Thus a Java applet that prevents unauthorized copying of digital images from within Netscape Communicator or Internet Explorer can be circumvented by a user pressing on a Print Screen button of his keyboard, or by a user copying and pasting from a window of his web browser to a window of another software application.

SUMMARY OF THE INVENTION

The present invention provides a method and system for enabling a user to view protected image data using his web browser without being able to copy it. The slogan "Look but Don't Touch™" has been adopted to describe the feature of the present invention that enables a user to view content without being able to copy it into his computer.

The present invention is distinct from prior art methods in several respects. A first distinction is that the present invention displays an image to a user without downloading unmodified image data to the user's computer. Thus, unlike software piracy techniques that protect an original copy of software from being illegally copied, the present invention does not provide an original copy in the first place.

A second distinction is that the present invention prevents a user from copying a protected image both from within and from without his web browser. Specifically, the present invention blocks copying of an image from within his web browser, when a user selects the "Save Image As . . ." command and when a user prints the contents of a web browser window. It also blocks copying of an image from without when a user presses the "Print Screen" button of his keyboard or attempts to copy from his web browser window and paste onto a window of another application, or when a third party software application attempts to use the "Print Screen" command.

In a preferred embodiment, the present invention uses a software web server plug-in that filters HTTP requests and sends substitute data, such as encrypted image data, for requested image data that is protected. It also uses a software web browser plug-in for displaying the substitute data and for blocking the ability to copy protected image data being displayed from the video buffer of the user's computer. It also uses a management tool for setting protection status of images and web pages residing on one or more server computers.

There is thus provided in accordance with a preferred embodiment of the present invention a method for protecting digital images distributed over a network, including the steps of receiving a request from a client computer running a network browser, for an original layout page containing references to digital images therein, parsing the original layout page for the references to digital images, generating a modified layout page from the original layout page by replacing at least one of the references to digital images in the original layout page with references to substitute data, and sending the modified layout page to the client computer.

There is further provided in accordance with a preferred embodiment of the present invention a method for protecting files distributed over a network, including the steps of displaying a list of files, generating protection status information in response to selection by a user of at least one of the files in the list of files, and sending the protection status information to a server computer.

There is yet further provided in accordance with a preferred embodiment of the present invention a system for protecting digital images distributed over a network, including a receiver receiving a request from a client computer running a network browser, for an original layout page containing references to digital images therein, a layout page parser parsing the original layout page for the references to digital images, a layout page generator generating a modified layout page from the original layout page by replacing at least one of the references to digital images in the original layout page with references to substitute data, and a transmitter sending the modified layout page to the client computer.

There is moreover provided in accordance with a preferred embodiment of the present invention a system for protecting files distributed over a network, including a user interface displaying a list of files, a protection status manager generating protection status information in response to selection by a user of at least one of the files in the list of files, and a transmitter sending the protection status information to a server computer.

There is additionally provided in accordance with a preferred embodiment of the present invention a method for protecting digital images distributed over a network, including the steps of receiving a request from a client computer, submitting the request to a server computer, receiving an original layout page containing references to digital images therein from the server computer, parsing the original layout page for the references to digital images, generating a modified layout page from the original layout page by replacing at least one of the references to digital images in the original layout page with references to substitute data, and sending the modified layout page to the client computer.

There is further provided in accordance with a preferred embodiment of the present invention a system for protecting digital images distributed over a network, including a receiver receiving a request from a client computer and receiving an original layout page containing references to digital images therein from a server computer, a transmitter submitting the request to the server computer and sending a modified layout page to the client computer, a layout page parser parsing the original layout page for the references to digital images, and a layout page generator generating the modified layout page from the original layout page by replacing at least one of the references to digital images in the original layout page with references to substitute data.

There is yet further provided in accordance with a preferred embodiment of the present invention a method for protecting digital images displayed in a web browser, including the steps of displaying a digital image by a web browser, the digital image including pixel data, requesting access to pixel data of the digital image, and in response to the requesting, blocking access to pixel data of the digital image.

There is additionally provided in accordance with a preferred embodiment of the present invention a method for protecting digital images displayed in a web browser, including the steps of displaying a digital image by a web browser, the digital image including pixel data, requesting access to pixel data of the digital image, in response to the requesting, intercepting a request to access pixel data of the digital image, and providing substitute data to pixel data of the digital image in a response to the request to access pixel data of the digital image.

There is moreover provided in accordance with a preferred embodiment of the present invention a system for protecting digital images displayed in a web browser, including a web browser displaying a digital image, the digital image including pixel data, a command processor requesting access to pixel data of the digital image, and a request blocker, blocking access to pixel data of the digital image requested by the command processor.

There is further provided in accordance with a preferred embodiment of the present invention a system for protecting digital images displayed in a web browser, including a web browser displaying a digital image, the digital image including pixel data, a command processor requesting access to pixel data of the digital image, a request interceptor intercepting a request to access pixel data of the digital image received from the command processor, and a data processor providing substitute data to pixel data of the digital image in a response to the request to access pixel data of the digital image.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
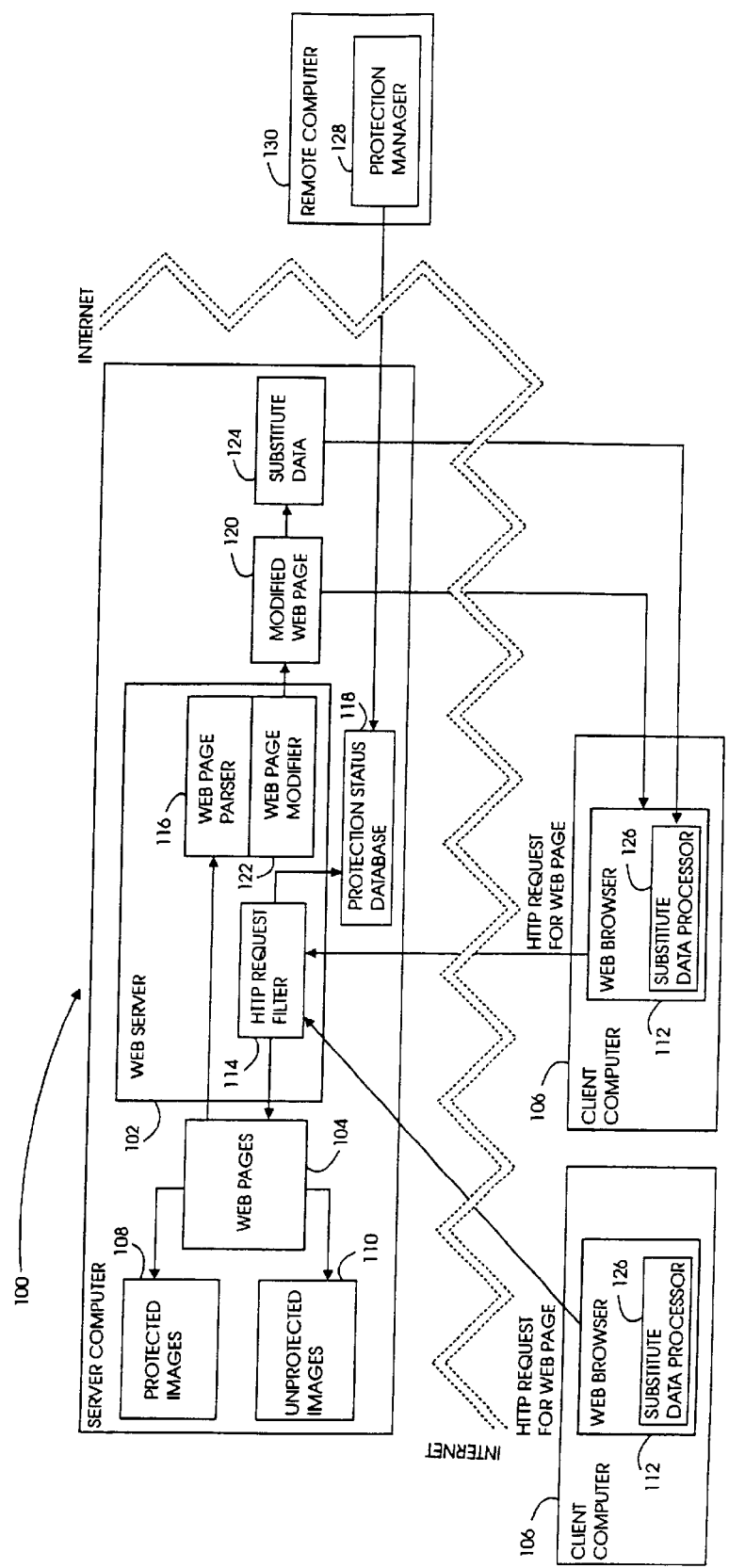
FIG. 1 is a simplified illustration of a system for copyright protection of digital images for use within a distributed server-client computing environment, in accordance with a preferred embodiment of the present invention.

The present invention concerns protection of digital images transmitted over a network from unauthorized copying and use. Unlike prior art methods used to prevent software piracy, the present invention enables a user to view an image in his web browser without ever receiving original unmodified digital image data, and without being able to save the displayed image on his computer.

Typically, digital images are viewed over the Internet within web pages, such as hyper-text markup language (HTML) or extended markup language (XML) pages. Such web pages are electronic data files, stored on server computers, containing layout information for displaying text and graphics, and for running software applications such as Java applets. Typically, the data for the graphic objects, such as images, displayed within a web page is not contained within the web page file itself. Instead, the graphic objects reside elsewhere on the same server computer or other server computers, and the web page file contains references to the graphic objects. A reference to a graphic object specifies the network address of the computer containing the graphic object, such as an IP address, together with the directory path (relative to a prescribed root directory) and filename for the graphic object.

When a web browser in a client computer downloads a web page file, it parses the web page in order to display it on a video monitor. While parsing the web page, the web browser encounters the references to graphic objects, and in turn downloads the graphic objects. Downloading a web page file and the graphic objects it references is typically done through the HTTP protocol. Client requests for data on server computers are issued through HTTP requests, and data transmission from server to client is issued through HTTP responses.

After downloading the graphic objects, the web browser can render the web page with the graphic objects embedded therein, and display it to the user on his video monitor. In turn, the user can interact with the displayed web page by clicking on hyperlinks to other web pages, or by interacting with an application such as a Java applet.

Most web browsers enable a user to view the source for the web page being displayed. For example, they may contain a menu item "View Page Source" under a "View" heading. In addition, they also enable a user to save images being displayed, by right-clicking on such an image with a mouse cursor positioned thereover, and selecting a "Save Image As . . ." menu item. Upon selection of the "Save Image As . . ." item, the web browser opens an Explorer type directory window that enables the user to select a folder and filename for the image being saved.

In a preferred embodiment of the present invention, the image data that is transmitted from a server computer to a client computer is encrypted image data that is generated from the original image data by encoding it using an encryption algorithm. In this embodiment, additional software may be required by the web browser in order to decode the encrypted data, since a standard web browser typically supports only a limited number of image file formats, such as GIF and JPEG, and may not contain the decoder necessary to decrypt the encrypted image data. For the Netscape Communicator web browser of Netscape Communications, Inc. of Mountain View, Calif., such additional software may be a plug-in or a Java applet. For the Internet Explorer web browser of Microsoft Corporation of Redmond, Wash., such additional software may be an Active-X control or a Java applet. The additional software is used to decode the encrypted image data, and render it for display on a video monitor.

When a user attempts to save an image being displayed by his web browser, the present invention, in a preferred embodiment, prevents him from doing so. There are several manners in which a user can attempt to save an image being displayed. The user may select the "Save Image As . . ." menu option that appears with right-clicking on the image.

The user may also attempt to save an image being displayed by copying the image from his web browser's cache. Typically, images being displayed by web browsers are stored temporarily in a local cache on the client computer.

The user may also attempt to copy the entire screen by pressing a "Print Screen" command key on the keyboard. Typically, this causes the contents of the video display buffer to be pasted onto the user's clipboard. The user may also attempt to save an image being displayed by running a software application outside of his web browser. For example, an image editing application, such as Paint Shop Pro of Jasc Software, may have the capability of copying images from within web browsers to their own windows.

For each scenario whereby the user attempts to save an image being displayed by his web browser, additional software used by the web browser is operative to prevent the image data from actually being saved. In one embodiment, the present invention replaces the image being saved with substitute data, so that the user in fact saves a substitute image. For example, the substitute image may be an encrypted image, which the user is unable to view. For another example, the substitute image may be a watermarked version of the original image, derived therefrom by composing watermarks over the image. For yet another example, the substitute image may be a prescribed image, possibly unrelated to the image being displayed by the web browser. Thus when the user selects the "Save Image As . . ." option, or presses the "Print Screen" button, or copies the image from another software application, the image that is saved into the local file system or copied to the clipboard is a substitute image.

In another embodiment, the present invention disables the user's ability to save an image being displayed, and does not enable the user to save image data at all. For example, the "Save Image As . . ." menu option may be disabled, so that the user cannot select it, and the "Print Screen" key on the keyboard may be disabled so that when the user presses on it, nothing happens, and copying of the image by other software applications may be blocked.

As described in detail hereinbelow, controlling or disabling the "Save Image As . . ." menu option is preferably accomplished by additional software used by the web browser through intervention with mouse control functions. Controlling or disabling the "Print Screen" key on the keyboard is preferably accomplished by additional software used by the web browser through intervention with keyboard control functions. Controlling or disabling copying of displayed image data by other software applications is preferably accomplished within the Windows operating system by intervention ("patching") with the Windows application programming interface (API) functions which copy pixel data from the video buffer of a computer, such as BitBlt, StretchBlt, PlgBlt, GetPixel and GD132.

Similarly, controlling or disabling copying of displayed image data by other software applications is preferably accomplished within the Macintosh operating system by using a system extension to intervene with Toolbox functions. ToolBox calls are managed by an array of pointers in a Trap Dispatch Table, each pointer pointing to appropriate program code. As described in more detail hereinbelow, the system extension can change these pointers so that they point to different program code. The different program code corresponds to patched ToolBox functions.

A web server administrator ("webmaster") is responsible for configuring web server software and for managing web pages and images stored on a server computer. Typically, the administrator may wish to protect some of the images from unauthorized copying or use, and may wish to have other images unprotected, in accordance with instructions from the owners of the images. In a preferred embodiment, the present invention includes a management tool for managing protection of digital images residing on a server computer. The management tool preferably enables an administrator to select specific images to be protected from unauthorized copying or use as described hereinabove.

Image protection may be specified in several modes, including (i) on an individual image-by-image basis, (ii) on a web page basis, (iii) on a folder basis, and (iv) on a tagged basis, as described hereinbelow. Protection specification on an individual image-by-image basis is carried out by selecting one or more image files within the management tool, preferably by a user interface that presents an Explorer-type window for navigating through file systems.

Protection specification on a web page basis is carried out by selecting one or more web page files within the management tool. Selection of a web page for protection entails protection of all images referenced within the selected web page. In one embodiment of the present invention, such referenced images are maintained protected when the same images are referenced within other web pages. In an alternate embodiment of the present invention, such referenced images are protected only when referenced within web pages that are protected.

Protection specification on a folder basis is carried out by selecting one or more folders within the management tool. Selection of a folder for protection entails protection of all web pages and all images referenced within the selected folder and, recursively, within all sub-folders thereof.

Protection specification on a tagged basis is carried out by delineating segments within a web page that are to be protected by protection tags. Specifically, in a preferred embodiment of the present invention, protect and unprotect tags, such as <!protect> and <!/protect>, are used to bound segments of layout instructions within a web page, and every image referenced within such a segment between the tags is protected. Preferably, images referenced between the protection tags are protected only when referenced between protection tags within web pages, and are otherwise unprotected, unless additional protection has been specified by one of the above modes (individual image-by-image basis, web page basis, and/or folder basis).

In a preferred embodiment of the present invention, the management tool can be used to change the protection status (protected/unprotected) of images on a server computer from time-to-time.

In a preferred embodiment of the present invention, the management tool need not be operated from the server computer that contains the images whose protections are being specified. Instead, it can be executed from any computer connected to such server computer via a network. Thus a web administrator can remotely set the protections of images on multiple server computers from his own local computer, as long as there is a network connection between his computer and the multiple server computers. Reference is now made to FIG. 1, which is a simplified illustration of a system for copyright protection of digital images for use within a distributed server-client computing environment, in accordance with a preferred embodiment of the present invention. A server computer 100 typically includes web server software 102 that serves web pages 104 to a plurality of client computers 106 over the Internet. Web pages 104 typically contain references to images that are to be embedded within the pages when the pages are rendered on client computers 106. The images referenced in web pages 104 typically reside on server computer 100, although they may reside on other computers as well. Operation of the present invention when the images reside on other computers is described below with reference to FIG. 9 and FIG. 10.

Some of the images referenced in web pages 104 are preferably designated as protected images 108, which the owners desire to protect from unauthorized copying or use. Others of the images referenced in web pages 104 are designated as unprotected images 110, which the owners are not concerned about protecting from unauthorized copying or use. Designation of images as protected or unprotected is typically made by the owners of the images. For example, images may be designated as protected images when they contain significant creative content, and images may be designated as unprotected images when they contain little or no creative content, it being understood that other criteria can be used alone or in combination as a basis for distinguishing between protected and unprotected images.

Client computers 106 typically use web browser software 112 to access web pages stored on server computers 100, over the Internet. A web browser 112 requests a web page 104 from a server computer 100 by issuing an HTTP request. An HTTP request arriving at server computer 100 is processed by web server software 102.

In a preferred embodiment of the present invention, an incoming HTTP request to server computer 100 is routed to an HTTP request filter 114. HTTP filter 114 accesses the requested web page 104 and parses it using a web page parser 116, to identify the images that are referenced therewithin. Server computer 100 maintains a protection status database 118 that stores a protection status (protected/unprotected) for each image residing on server computer 100. HTTP filter 114 determines the protection status of each image referenced within web page 104, using protection status database 118. It will be appreciated by those skilled in the art that protection status database 118 may reside on a different computer than server computer 100, but when it resides on server computer 100 the system of the present invention can conveniently determine protection status of images without having to retrieve such information from another computer.

An unprotected image 110 referenced within web page 104 is handled by web server software 102 in the normal fashion. Specifically, neither the reference to unprotected image 110 nor image 110 itself are modified. However, a protected image 108 referenced within web page 104 is handled differently. A modified web page 120 is generated by a web page modifier 122. Specifically, the reference to protected image 108 in web page 104 is modified by web page modifier 122 so as to reference substitute data 124.

Substitute data 124 preferably corresponds to an image that is visually identical or substantially similar to protected image 108. When substitute data 124 corresponds to an image that is visually identical to protected image 108, it is preferably an encrypted version of the protected image data. In a preferred embodiment of the present invention, the choice of what type of substitute data 124 to use depends on the owner's preference (e.g. whether or not to display an identical version of the protected image) and on the type of web browser 112 issuing the HTTP web page request from client computer 106.

Specifically, with regard to the type of web browser 112 issuing the HTTP web page request, web browsers 112 may include software that functions as a substitute data processor 126, in the form of a browser plug-in, Java applet or Active-X control. Such a substitute data processor is capable of rendering an encrypted image, and is also capable of preventing a user of client computer 106 from copying an image that is displayed by web browser 112.

In a preferred embodiment of the present invention the substitute data processor is not a Java applet, since Java applets are not readily capable of protecting against Windows API calls that access pixel data from the video buffer of a computer, as mentioned hereinabove. However, it is apparent to those skilled in the art that as Java capabilities are extended, Java applets may become appropriate for such protection.

When web browser 112 includes substitute data processor 126, substitute data 124 can be encrypted image data, or other image data in a format that would not be supported by a standard web browser 112 that does not include substitute data processor 126. Furthermore, when web browser 112 includes a substitute data processor 126, substitute data 124 can appear visually identical to protected image 108 when rendered by substitute data processor 126, and yet a user of client computer 106 is not able to copy or use it without authorization.

When web browser 112 does not include substitute data processor 126, substitute data 124 should be compatible with a standard web browser. For example, substitute data 124 can be a standard JPEG image. Alternatively, when web browser 112 does not include substitute data processor 126, substitute data 124 can be encrypted image data if modified web page 120 is generated so as to prompt client computer to download substitute data processor 126 in order to display substitute data 124. This is typically the way in which web pages prompt a client computer to download Java applets, Active-X controls within Internet Explorer, and plug-ins utilizing the Smart Update feature within Netscape Communicator.

In a preferred embodiment of the present invention, the determination of which images on server computer 100 are protected images 108 and which images are unprotected images 110 is managed by a protection manager. 128 residing on a remote computer 130, connected to server computer 100 by a network. It will be appreciated by those skilled in the art that protection manager 128 may reside on server computer 100, but the possibility of it residing on a remote computer 130 affords greater convenience to an administrator who can then administer server computer 100, and other server computers as well, remotely off-site.

Figure 2:
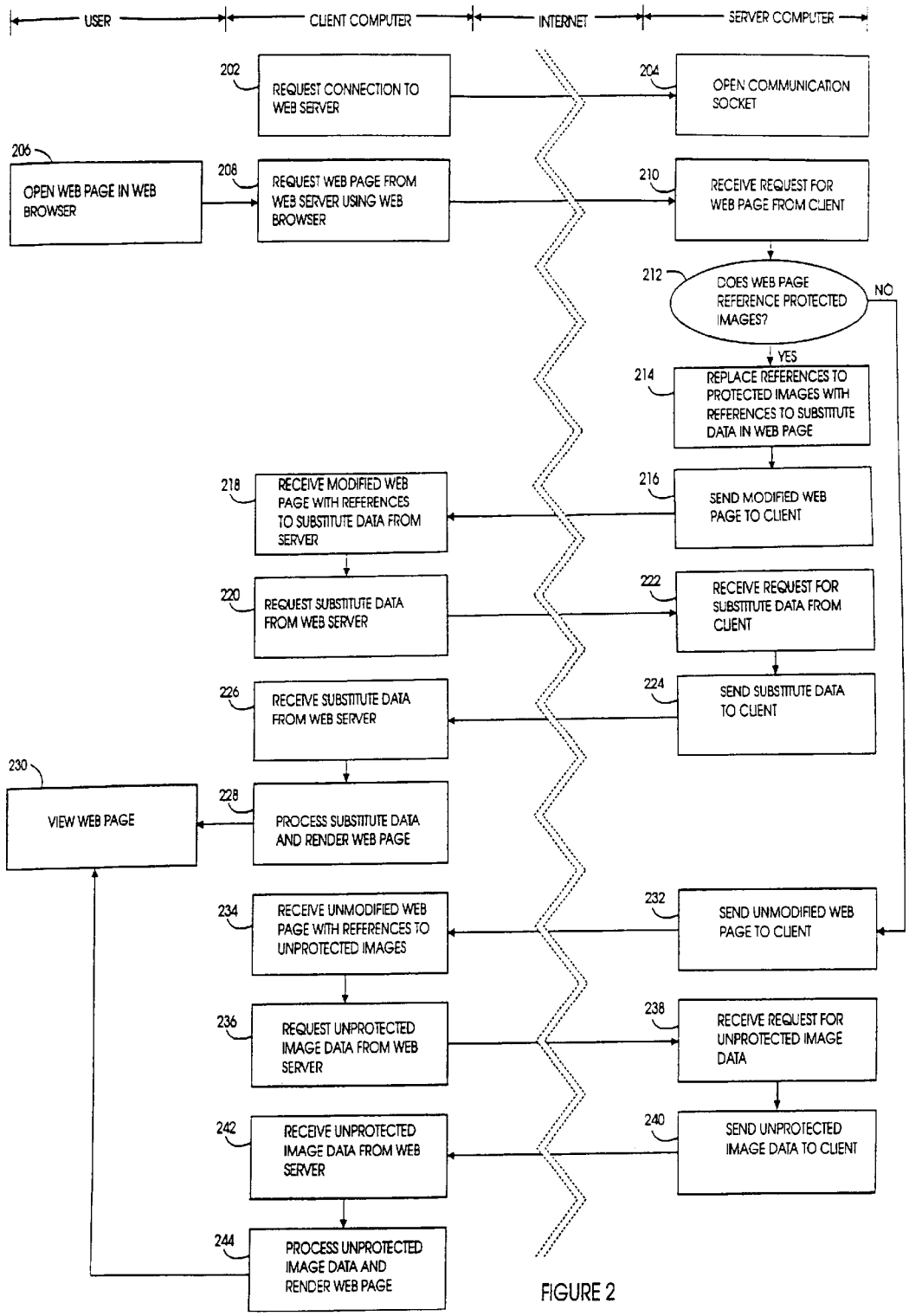
FIG. 2 is a simplified flowchart of a method for protecting digital images that are distributed within a server-client computing environment, in accordance with a preferred embodiment of the present invention.

Reference is now made to FIG. 2, which is a simplified flowchart of a method for protecting digital images that are distributed within a server-client computing environment, in accordance with a preferred embodiment of the present invention. The flowchart is divided into three columns. The leftmost column includes steps performed by a user, the second column from the left includes steps performed by a client computer, and the rightmost column includes steps performed by a server computer connected to the client computer over the Internet or such other network of computers.

At step 202 the client computer requests a connection to the server computer. At step 204 the server computer opens a communication socket between the client computer and the server computer. At step 206 the user requests to open a web page using his web browser and, in response, at step 208 the client computer issues an HTTP request for the web page to a web server on the server computer, using the web browser. At step 210 the web server receives the HTTP request for the web page from the client computer.

In a preferred embodiment of the present invention, at step 212 the server computer searches a database to determine whether or not the web page being requested references any protected images, or has protection tags. If so, it routes the incoming HTTP request to an HTTP request filter, as described hereinabove with respect to FIG. 1. The HTTP filter applies a web page parser to the requested web page and identifies the images referenced therewithin. At step 214 the server computer generates a modified web page wherein references to the protected images are replaced with references to substitute data. The substitute data is preferably derived from the protected images. For example, the substitute data may be encrypted image data, obtained by applying an encryption algorithm to the protected image data. The modified web page is preferably a separate web page generated by a web page modifier, so that the original web page is preserved, as indicated in FIG. 1. Alternatively, the substitute references may be incorporated directly into the original web page, without generation of a separate modified web page.

At step 216 the modified web page is sent back to the client computer within an HTTP response. At step 218 the client computer receives the modified web page containing references to substitute data, and the web browser begins to render the modified web page. In rendering the modified web page, the web browser encounters the references to the substitute data, and at step 220 the substitute data processor within the client computer issues to the web server an HTTP request for the substitute data. At step 222 the server computer receives the HTTP request for the substitute data, and at step 224 the server sends an HTTP response containing the substitute data to the client computer. At step 226 the client computer receives the HTTP response containing the requested substitute data, and at step 228 the client computer processes the substitute data using a substitute data processor, as described hereinabove with respect to FIG. 1, and renders the web page.

At step 230 the user views the web page he requested. It is thus appreciated that the present invention enables the user to view protected images without being able to download them to his computer in unmodified form. Instead, substitute data is downloaded, such as encrypted image data.

If the server computer determines at step 212 that the requested web page does not reference protected images and does not have protection tags, then the HTTP request is passed to the server without any parsing. In this case, the processing is much simpler, and proceeds in the normal manner. Specifically, a modified web page is not generated and substitute data is not used. Rather, at step 232 the unmodified web page is sent to the client computer within an HTTP response. At step 234 the client computer receives the HTTP response containing the unmodified web page, and the web browser begins to render the web page. In rendering the web page, the web browser encounters the references to unprotected images, and at step 236 the client computer issues an HTTP request for the unprotected images to the web server. At step 238 the server computer receives the HTTP request for the unprotected images, and, in response, at step 240 the server computer sends an HTTP response containing the unprotected images. At step 242 the client computer receives the HTTP response with the unprotected image data, and at step 244 the web browser processes the unprotected images and renders them with the web page.

At step 230 the user views the web page he requested. It is thus appreciated that the unprotected image data is downloaded to the client computer as unmodified data, and is therefore susceptible to unauthorized copying or use.

Figure 3:
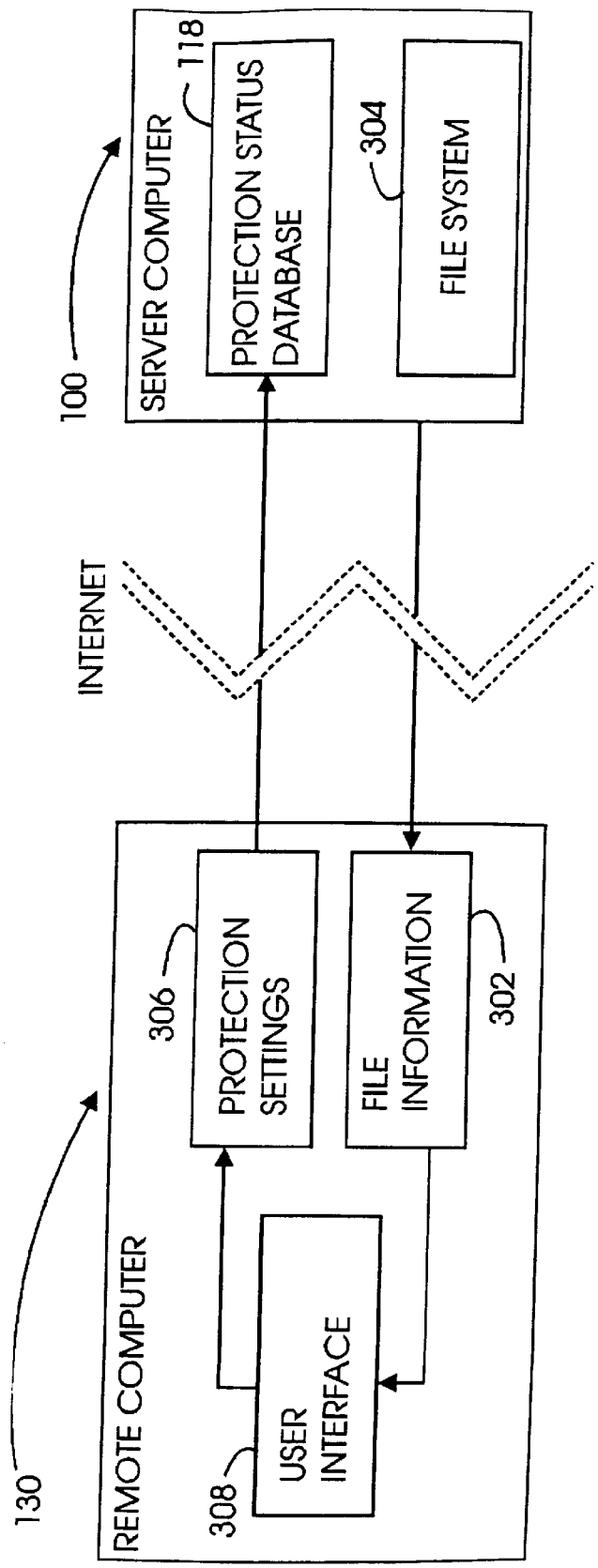
FIG. 3 is a simplified illustration of a management system, for managing protection of digital images, in accordance with a preferred embodiment of the present invention.

Reference is now made to FIG. 3, which is a simplified illustration of a management system, for managing protection of digital images, in accordance with a preferred embodiment of the present invention. Remote compute 130 administers protection of images on server computer 100 by entering and editing protection status information (protected/unprotected) within protection status database 118. Remote computer 130 retrieves file information 302 from file system 304 of server computer 100, and retrieves protection settings 306 from protection status database 11 8. Using file information 302, a user interface 308 displays a list of folder names, web page file names and image file names for the files in file system 30)4.

Protection settings 306 are used by user interface 308 to display an indicator of protection status alongside each folder, web page and image. For example, in a preferred embodiment of the present invention, protection settings 306 are indicated to a user as follows:

(i) an icon of a padlock is displayed alongside images that are designated as protected, whereas no icon is displayed alongside images that are designated as unprotected;

(ii) a dark blue page icon is displayed alongside web pages all of whose referenced images are designated as protected, a light blue page icon is displayed alongside web pages some, but not all of whose referenced images are designated as protected, and a white page icon is displayed alongside web pages none of whose referenced images arc designated as protected; and (iii) a dark blue folder icon is displayed alongside folders all of whose referenced images are designated as protected, a light blue folder icon is displayed alongside folders some, but not all of whose referenced images are designated as protected, and a white folder icon is displayed alongside folders none of whose referenced images are designated as protected.

Protection settings 306 can be edited by means of user interface 308. A user can select one or more images from among the list of image filenames displayed by user interface 308, and set their protection status to protected or unprotected. The user can also select one or more web pages from among the list of web page file names displayed by user interface 308, and set their protection status to protected or unprotected. Setting the protection status of a web page to protected or unprotected is equivalent to setting the status of all the images referenced therewithin to protected or unprotected, respectively. In one embodiment of the present invention, such images referenced within a protected web page are treated as protected within any other web page, and in an alternate embodiment of the present invention, such images are treated as protected only within protected web pages.

Similarly, the user can select one or more folders from among the list of folder names displayed by user interface 308, and set their protection status to protected or unprotected. Setting the protection status of a folder to protected or unprotected is equivalent to setting the status of all the images and web pages within the folder and, recursively, within all sub-folder-s thereof, to protected or unprotected, respectively.

After editing protection settings, the user can click on a "submit" button in order to apply the modified protection settings on server computer 100; i.e., in order to have the modified protection settings take effect. Clicking on the submit button causes protection settings 306 to be transmitted from remote computer 130 to server computer 100. When server computer 100 receives the modified protection settings, it incorporates them into protection status database 118. Once so incorporated, the modified protection settings take effect, and are used thenceforth to determine the protection status of the images on server computer 100.

In a preferred embodiment of the present invention, after the submit button is clicked and protection status database 118 is updated, the modified protection settings 306 are indicated in user interface 308 by updated icons, as described hereinabove.

Figure 4:
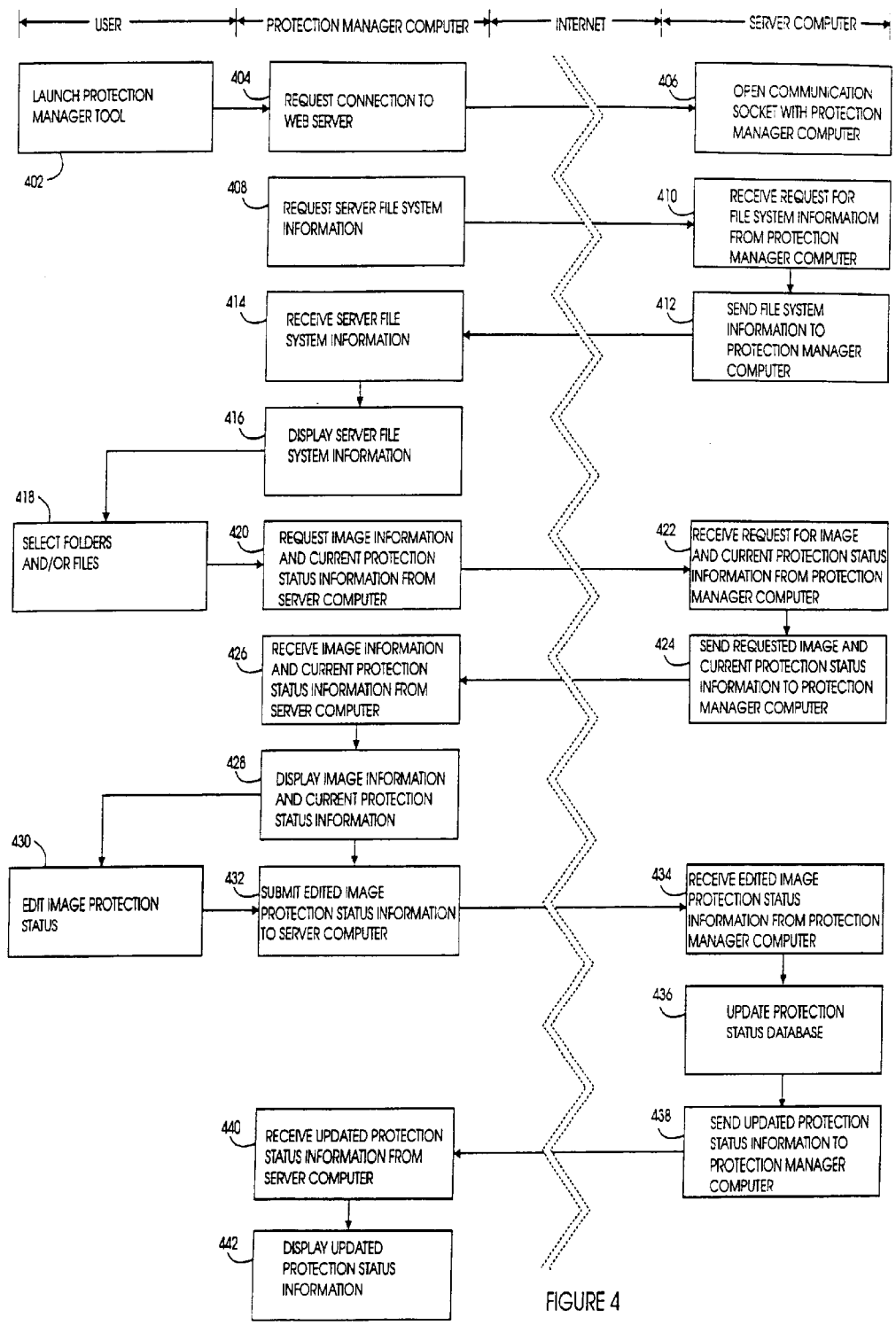
FIG. 4 is a simplified flowchart of a method for managing digital image protection, in accordance with a preferred embodiment of the present invention.

Reference is now made to FIG. 4, which is a simplified flowchart of a method for managing digital image protection, in accordance with a preferred embodiment of the present invention. The flowchart is divided into three columns. The leftmost column includes steps performed by a user, the second column from the left includes steps performed by a protection manager computer, and the rightmost column includes steps performed by a server computer.

At step 402 the user launches a protection manager software tool. At step 404 the protection manager computer initiates connection to a web server on the server computer. At step 406 the server computer opens a communication socket with the protection management computer. At step 408 the protection manager computer requests file system information from the server computer. The requested file system information includes a site map of the folders and files in the server computer's file system, and protection status information for the folders and files listed in the site map. Protection status of folders and files is preferably one of the following: (i) protected, (ii) partially protected, (iii) protected using tags, and (iv) un-protected.

At step 410 the server computer receives the request for file system information, and at step 412 the server computer sends the requested information to the protection manager computer. At step 414 the protection manager computer receives the requested file system information from the server computer, and at step 416 the protection manager computer displays this information within a user interface of the protection manager tool.

At step 418 the user selects one or more folders and/or web pages, from among a list of folder names and web page file names displayed by the user interface. In response, at step 420 the protection manager computer requests image information and protection status information from the server computer, for the images contained within the selected folders and/or for the images referenced within the selected web pages. At step 422 the server computer receives the request from the protection manager computer, and at step 424 the server computer sends the requested image information and protection status information to the protection manager computer. As part of step 424 it may be necessary for the server computer to parse the selected web pages in order to identify the images referenced therewithin. Parsing web pages is described hereinabove with reference to FIG. 1.

At step 426 the protection manager computer receives the image information and protection status information, and at step 428 it displays this information within the user interface of the protection manager tool. Each folder name, web page file name and image file name is displayed in the user interface with a corresponding icon alongside that indicates its protection status. For example, file names of protected images are displayed with an icon of a padlock alongside.

At step 430 the user selects one or more folders, web pages and/or images from the list of folder names, web page file names and image file names displayed by the user interface, and sets their protection status to protected or unprotected. Setting a protection status for one or more folders causes such protection status to apply to all of the images within such folders. Similarly, setting a protection status for one or more web pages causes such protection status to apply to all of the images referenced within such web pages.

After editing the protection status of various folders, web pages and images, the user clicks on a "submit" button to apply the new protection settings. At step 432, the protection manager computer submits the edited image protection status information to the server computer. At step 434 the server computer receives the edited protection status information, and at step 436 the server computer incorporates this information into a protection status database. At step 438 the server computer sends the updated protection status information back to the protection manager computer, as a confirmation. At step 440 the protection manager computer receives the updated protection status information from the server computer, and at step 442 it displays the updated status information in the protection manager user interface.

For ease of use, in a preferred embodiment of the present invention the protection manager computer displays modified status information upon selection by the user, as soon as a protect button is pressed, prior to submitting it to the server computer. The changes are only sent to the server computer when a submit button has been pressed. In this embodiment steps 438, 440 and 442 need not be performed.

Some URL's do not correspond to existing web page files, but instead contain instructions, such as CGI script instructions or Visual Basic instructions, for generating dynamic web pages, such as active server pages. When a user opens such an URL, the server computer typically generates a web page dynamically, and sends the generated web page to the client computer.

When web pages are generated dynamically, the server computer cannot parse the web page for references to protected images until the web page is generated. However, when the server receives an incoming HTTP request to generate a web page, it sends the generated web page as an outgoing HTTP response back to the IP address of the originating HTTP request. In order to be able to modify the generated web page before sending it to the client, so as to replace references to protected images with reference to substitute data, the present invention preferably re-submits the incoming HTTP request locally from the server computer to itself in order to be able to intercept the dynamically generated web page prior to its being sent to the client.

Specifically, the incoming HTTP request from the client computer is routed to an HTTP filter, as described above with reference to FIG. 1. However, in distinction to FIG. 1, the HTTP filter re-submits the HTTP request from the server computer to itself. This ensures that when the server computer generates the dynamic web page, it will return it to the HTTP filter, rather than to the client. When the server computer re-submits the HTTP request, it preferably does so by passing along any HTTP header information, such as a cookie, or any POST information in an HTTP POST request.

Before generating the dynamic web page, in order to ensure that the HTTP request originates from HTTP filter, rather than from another source, the HTTP filter preferably appends an identifier at the beginning of the original HTTP request, prior to re-submitting the HTTP request. Thus the re-submitted HTTP request has an additional identifier in its beginning for authentication purposes.

Preferably, the server computer authenticates the HTTP request, based on the identifier in its beginning, before accepting the request and generating the dynamic web page. After authenticating the request, the server computer removes the identifier that was appended, and proceeds to process the request. If the HTTP request is not authenticated, the server computer denies the request and does not proceed to generate the dynamic web page.

In a preferred embodiment of the present invention, the appended identifier is randomly generated. This serves as a preventive measure against extraction and fraudulent use of the identifier, since the identifier is constantly being changed.

When the server computer authenticates the re-submitted HTTP request and, in turn, dynamically generates the web page, it sends the web page to the originator of the re-submitted HTTP request; namely, to the HTTP filter. Upon receipt of the web page, the HTTP filter can then parse the page to identify the images referenced therewithin, and can generate a modified web page in which references to protected images are replaced with references to substitute data, as described hereinabove with reference to FIGS. 1 and 2. The modified web page is sent back to the client computer in an HTTP response.

Figure 5:
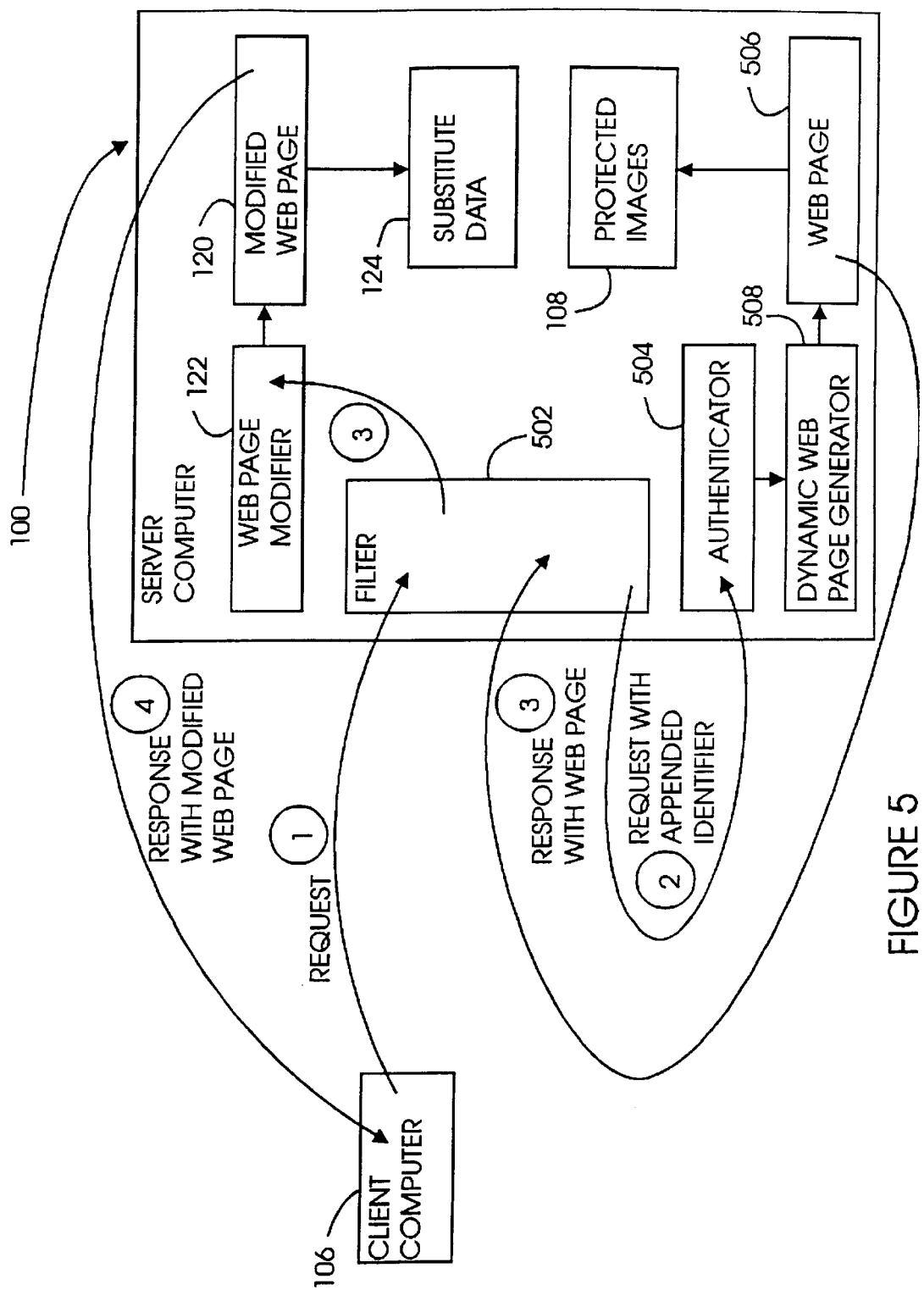
FIG. 5 is a simplified illustration of a system for copyright protection of digital images that are referenced in dynamically generated web pages, in accordance with a preferred embodiment of the present invention.

Reference is now made to FIG. 5, which is a simplified illustration of a system for copyright protection of digital images that are referenced in dynamically generated web pages, in accordance with a preferred embodiment of the present invention. Dynamically generated web pages are generated by a web server in response to an HTTP request. For example, an HTTP request may contain instructions for a CGI interpreter.

Similarly, images may also be dynamically generated. Examples of dynamically generated images are <img src=101.345.56.52/GetImage.asp?image=01> and
<img src=101.345.56.52/scripts/GetImage.cgi?image= name.jpg>.

Unlike the system illustrated in FIG. 1 where a requested web page already resides as an HTML, XML or such other web page file on a server computer, when a client computer issues a request for a dynamically generated web page or a dynaimically generated image, the request cannot be filtered until after it is processed, since only then is the web page or the image available.

In a preferred embodiment of the present invention, dynamically generated web pages are handled by re-routing an incoming HTTP request from the server computer to itself, in order that the dynamically generated web page first be processed by an HTTP request filter before being sent to the client computer. Specifically, in response to a user selecting a URL with a CGI script or such other script, client computer 106 issues an HTTP request to server computer 100 that includes instructions for generating a web page. The HTTP request is indicated by a circle-1 in FIG. 5. The incoming HTTP request is routed to a filter 502 for processing. Since the requested web page is not available at this stage, filter 502 cannot parse or modify the page.

Instead, filter 502 i-e-submits the HTTP request to server computer 100. In doing so, filter 502 appends an identifier at the beginning of the HTTP request, for authentication purposes. The re-submitted HTTP request is indicated by a circle-2 in FIG. 5. When the re-submitted HTTP request arrives at server computer 100 it is routed to an authenticator 504, which authenticates the request based on its appended identifier. Once authenticated, the identifier is removed from the re-submitted HTTP request, and it is processed by server computer 100. In processing the re-submitted HTTP request, server computer dynamically generates a web page 506 using a dynamic web page generator 508. Web page 506 references one or more protected images 108.

When web page 506 is generated, server computer 100 sends it within an HTTP response to the address of the originator of the request. The HTTP response is indicated by a circle-3 in FIG. 5. Since the re-submitted HTTP request originated from filter 502 of server computer 100, the HTTP response with web page 506 is sent to server computer 100. The response is routed to filter 502 for further processing.

Filter 502, after receiving the HTTP response with web page 506, can proceed to generate substitute data 124, and to generate a modified web page 120 using web page modifier 122, as is described hereinabove with reference to FIG. 1. Modified web page 120 contains a reference to substitute data 124, instead of a reference to protected images 108.

Modified web page 120 is included within an HTTP response and sent back to client computer 106. The HTTP response including modified web page 120 is indicated by a circle-4 in FIG. 5. The four indicators, circle-1, circle-2, circle-3 and circle-4 taken together illustrate the data flow from an original HTTP request to a final HTTP response.

As mentioned hereinabove, in a preferred embodiment of the present invention substitute data 124 can be rendered so as to generate images visually equivalent to protected images 108, in which case the user can view the content of protected images 108 without downloading unmodified protected image data to client computer 106. For example, substitute data 124 can be encrypted image data.

Figure 6:
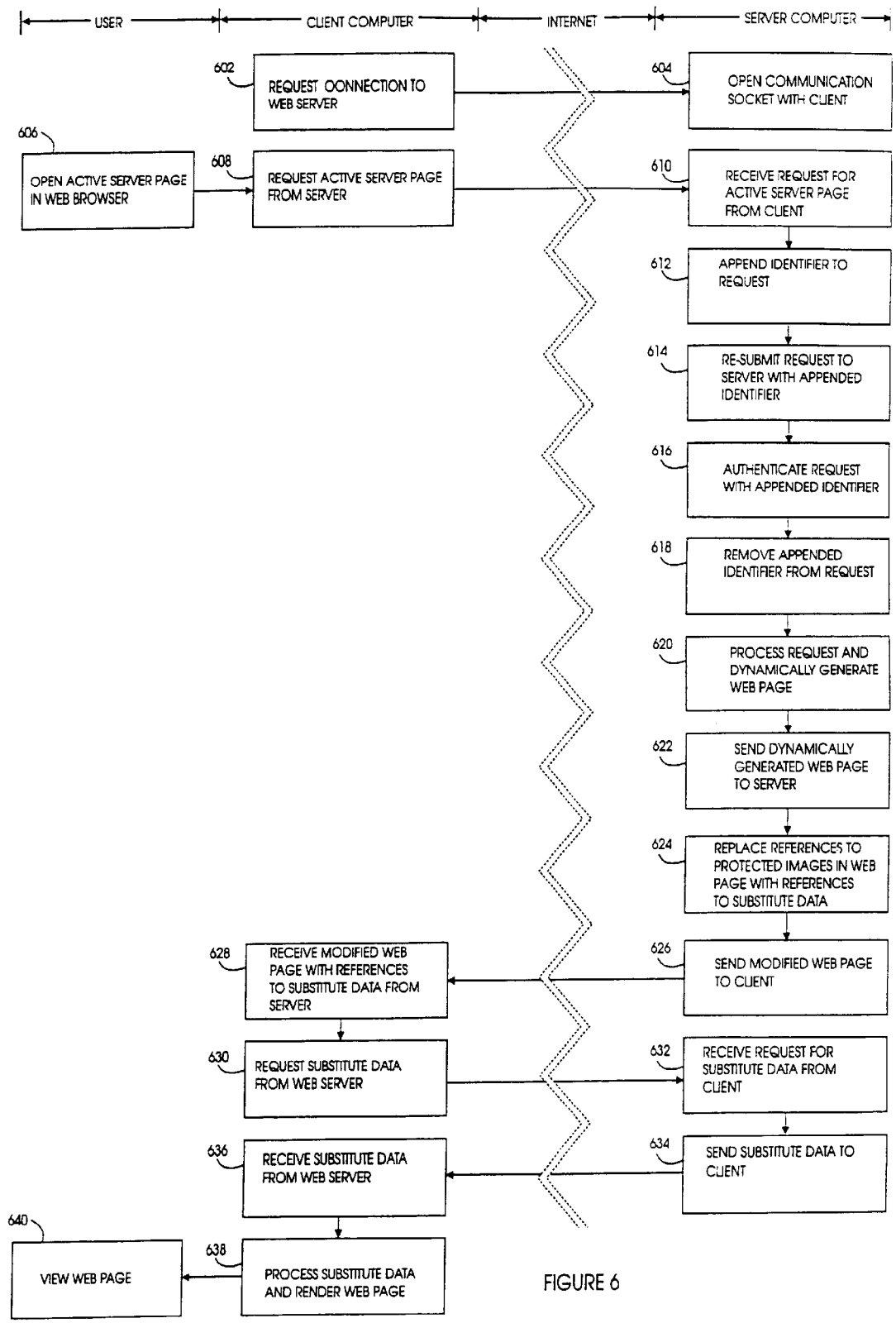
FIG. 6 is a simplified flowchart of a method for protecting digital images that are referenced in dynamically generated web pages, in accordance with a preferred embodiment of the present invention.

Reference is now made to FIG. 6, which is a simplified flowchart of a method for protecting digital images that are referenced in dynamically generated web pages, in accordance with a preferred embodiment of the present invention. The flowchart is divided into three columns. The leftmost column includes steps performed by a user, the second column from the left includes steps performed by a client computer, and the rightmost column includes steps performed by a server computer connected to the client computer over the Internet or such other network of computers.

At step 602 the client computer initiates a connection to the web server. At step 604 the server computer opens a communication socket between the client computer and the server computer. At step 606 the user opens a URL for an active server page in his web browser, or another such URL that includes a request for dynamically generating a web page. At step 608 the client computer issues an HTTP request for an active server page to the server computer. At step 610 the server computer receives the request for the active server page from the client computer. At step 612 the server computer appends an identifier at the beginning of the HTTP request, and at step 614 the server computer re-submits the HTTP request to the server computer with the appended identifier. At step 616 the server computer receives the re-submitted HTTP request and authenticates the request based on its appended identifier. If the request is authenticated, then at step 618 the server computer removes the appended identifier from the request, and at step 620 the server processes the request and dynamically generates a web page that references one or more protected images.

At step 622 the server incorporates the dynamically generated web page within an HTTP response and sends it to an address of the originator of the HTTP request. Specifically, since the HTTP request was re-submitted by the server computer at step 614, the server computer is the originator of the re-submitted HTTP request and, as such, the HTTP response containing the web page referencing protected images is transmitted to the server computer. It can be appreciated that authentication at step 616 is necessary in order to control HTTP responses that contain unmodified web pages referencing protected image data, so that they are only transmitted to server computer 100, and not to any other computers.

At step 624 the server computer processes the dynamically generated web page similar to the processing described hereinabove with reference to FIG. 2. Specifically, the server generates a modified web page having references to substitute data in place of the references to protected images. At step 626 the server computer sends an HTTP response including the modified web page to the client computer, and at step 628 the client computer receives the HTTP response. At step 630 the client's web browser renders the modified web page and, in doing so, encounters the references to substitute data and, in turn, requests the substitute data from the server computer. At step 632 the server computer receives the request for the substitute data, and at step 634 the server computer sends the substitute data to the client computer. At step 636 the client computer receives the substitute data, and at step 638 the client computer's web browser processes the substitute data and renders it embedded within the web page. Finally, at step 640 the user views the web page.

As described hereinabove, in a preferred embodiment of the present invention, when a user views a web page containing protected images, the image data sent from a server computer to the user's client computer is substitute data. For example, the substitute data can be encrypted image data. This ensures that the user cannot use his web browser to save an unmodified version of the protected image. Moreover, as described hereinabove, in a preferred embodiment of the present invention, software included within the web browser is used to prevent the user from saving a displayed image using the "Save Image As . . ." option. The "Save Image As . . ." selection can be disabled, or alternatively it can be modified so that substitute image data is provided instead of protected image data.

However, it is apparent to those skilled in the art that in order to display a protected image within a web page, at some level within the operating system decoded pixel data has to be available. Typically, a video card displaying image data on a video monitor stores the image data within a video display buffer. As such, even if the image data is encrypted when downloaded to the client computer, within the client video buffer the data is available as raw pixel data, and at some level the encrypted data is decoded before it can be displayed.

Pixel data stored within a video display buffer is susceptible to unauthorized use or copying, since an operating system typically enables a programmer to access data in the video display buffer. For example, the Windows operating system of Microsoft Corporation of Redmond, WA, provides system functions, such as the familiar BitBlt function, for accessing pixel data within the video display buffer. Moreover, such operating systems provide high level functions, such as the Print Screen function, which serve to copy data from the video display buffer to another memory buffer, such as a clipboard. Once image data has been copied to a clipboard, it can be easily saved and used for unauthorized purposes.

In a preferred embodiment, the present invention prevents a user from using Windows API functions, such as BitBlt, StretchBlt, PlgBlt, GetPixel and GDI32, to copy protected image data, by including software within the user's web browser that substitutes other functions for those Windows API functions. For example, the software within the user's web browser provides a substitute BitBlt function, which is invoked instead of the standard system BitBlt function when the user issues a command to copy data from the video display buffer. The substitute BitBlt function includes special logic for dealing with protected image data, but is otherwise identical to the standard system BitBlt function. The special logic serves to supply substitute pixel data instead of protected image data, so that the data that is copied to the user's clipboard is different from the raw pixel data of protected images. For example, the special logic can compose watermarks and/or a text message onto protected image pixel data, or it can encrypt protected image pixel data, or it can supply a completely white image instead of a protected image.

By providing a substitute BitBlt function, or such other system level function, the present invention prevents unauthorized copying and use of protected image data whenever an attempt is made to copy from the video display buffer. This includes a user's invocation of the Print Screen command, as well as another software application, such as an image editing application, running within or external to the user's web browser, attempting to copy and paste from the video display buffer.

Figure 7:
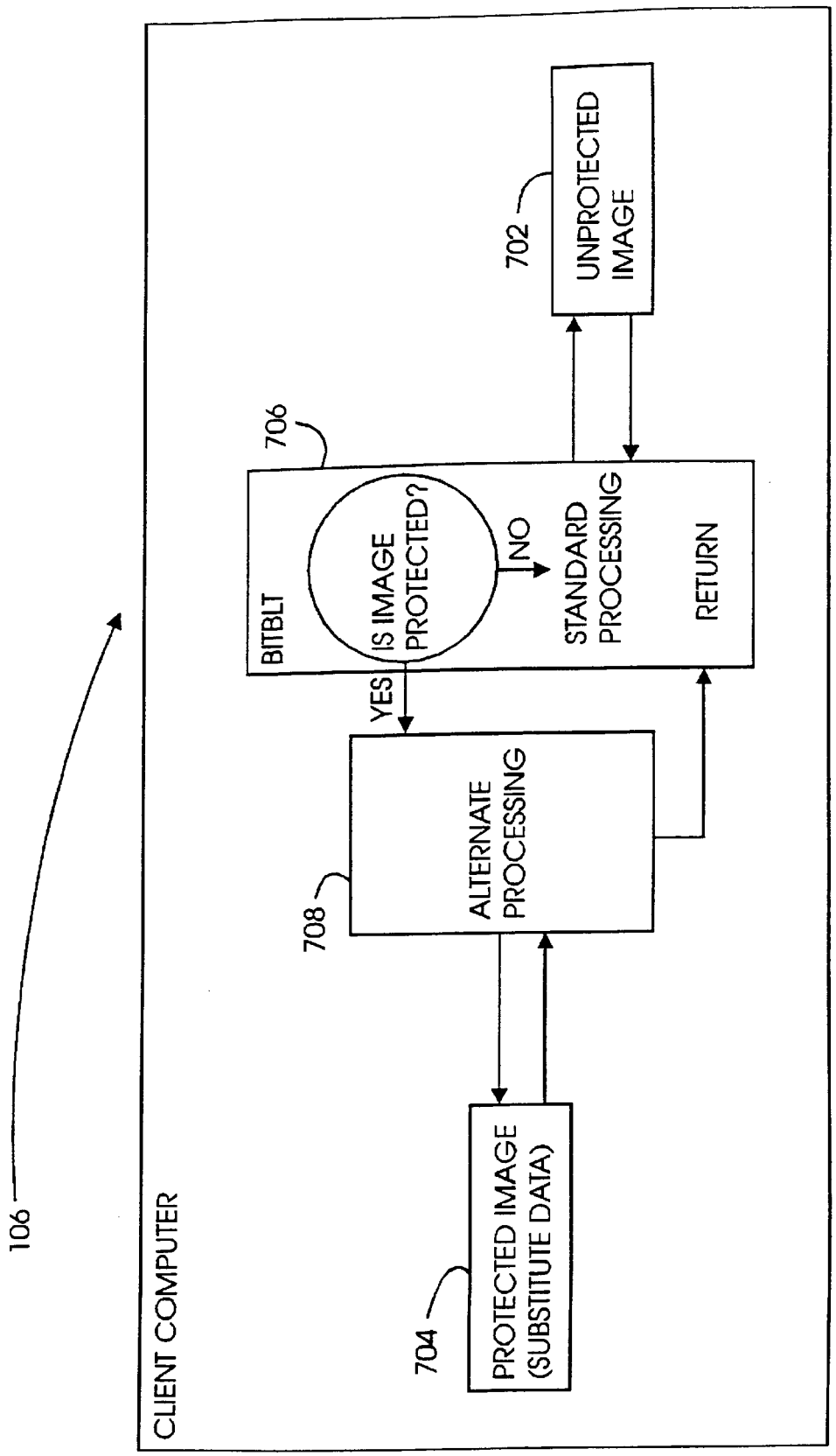
FIG. 7 is a simplified illustration of a system for preventing unauthorized copying of digital images within a client computer, in accordance with a preferred embodiment of the present invention.

Reference is now made to FIG. 7, which is a simplified illustration of a system for preventing unauthorized copying of digital images within a client computer, in accordance with a preferred embodiment of the present invention. Client computer 106 displays an image accessed over the Internet using a web browser.

The image may be an unprotected image 702 or substitute data for a protected image 704. A user issues a command in an attempt to copy the image from his video display buffer. For example, the user may press the "Print Scrn" button on his keyboard, or invoke such other screen capture command, in order to copy the data in the video display buffer onto his clipboard. For another example, the user may try to copy and paste the image from his web browser window into a window of another software application.

The user's command invokes an operating system level function 706 used to access pixel data within the video buffer of client computer 106. For example, it may invoke the Windows BitBlt function. Typically, such a function 706 copies pixel data from the video buffer onto a clipboard.

In a preferred embodiment of the present invention, software such as a Netscape plug-in or an Internet Explorer Active-X control is used to modify operating system function 706, by introducing additional programming logic to be used when attempting to access pixel data from protected images. Modification of operating system function 706 is preferably accomplished by providing a substitute function of the same name, which supersedes and is invoked instead of the standard system function.

When attempting to access pixel data from protected image 704, operating system function 706 routes the request to an alternate processing unit 708. Alternate processing unit 708 can prevent any copying of pixel data, or it can modify the pixel data so as to watermark or otherwise modify the protected image. Similarly, alternate processing unit 708 can output pixel data for a pre-determined image, unrelated to the protected image.

On the other hand, when attempting to access unprotected image 702, the additional programming logic is avoided, and the standard processing is applied. Preferably this is accomplished by calling the standard system level function from within the substitute function.

Figure 8:
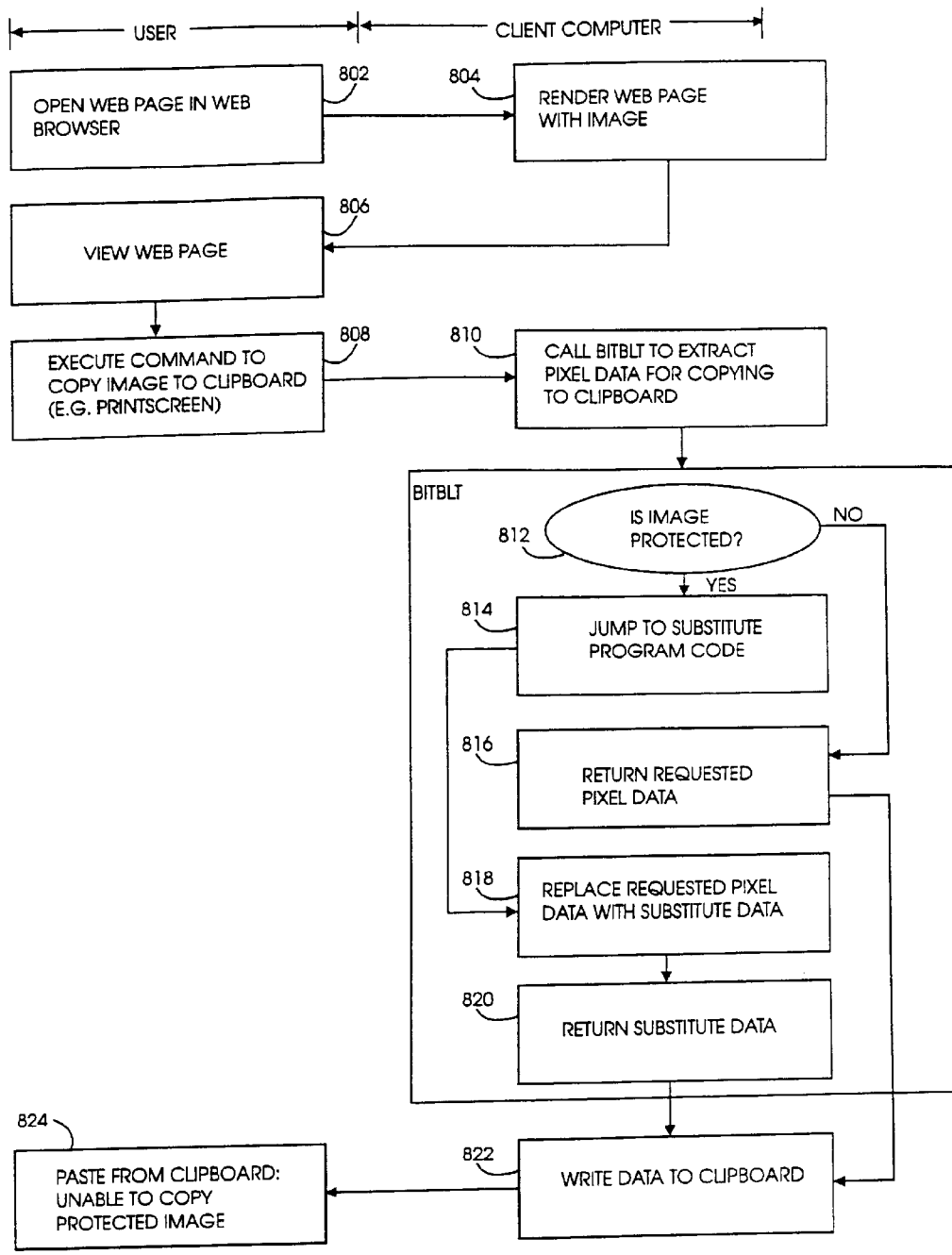
FIG. 8 is a simplified flowchart of a method for preventing unauthorized copying of digital images within a client computer, in accordance with a preferred embodiment of the present invention.

Reference is now made to FIG. 8, which is a simplified flowchart of a method for preventing unauthorized copying of digital images within a client computer, in accordance with a preferred embodiment of the present invention. The flowchart is divided into two columns. The leftmost column includes steps performed by a user and the rightmost column includes steps performed by a client computer.

At step 802 the user opens a web page in his web browser. At step 804 the client computer renders the web page including an embedded image. At step 806 the user views the web page, and at step 808 the user attempts to copy the embedded image by executing a command to copy pixel data of the image from a video buffer to a clipboard. For example, the user may execute the Print Screen or such other screen capture command.

At step 810, in response, the client computer calls an operating system function, such as the Windows BitBlt function, to extract pixel data from the video buffer and copy it to the clipboard.

At step 812 control logic passes to a substitute function, and a test is made as to whether or not the image data in the video buffer is protected. If so, then at step 814 processing jumps to step 818 where substitute program code replaces the requested pixel data with substitute data, and at step 820 the substitute data is returned by the operating system function. If the image data in the video buffer is not protected, then processing jumps to step 816 following step 812, and the requested pixel data is returned by the operating system function, as usual.

At step 822 the data returned from the operating system function is written to the clipboard and at step 824 the user pastes the data from the clipboard into a window of another software application, or save it into his computer. Since substitute data was used to replace protected pixel data, the user is unable to copy unmodified pixel data from the protected image.

The system and method described with reference to FIG. 1 and FIG. 2 deal with protection of digital images that are located on the same server computer as the web page that references them. In such a scenario, the present invention preferably uses filtering software residing on the server computer to generate substitute image data and a modified web page, as described hereinabove.

In some cases the protected images may not reside on the same computer as the web page that references them, and the filter software that modifies web pages and generates substitute image data may not reside on the computer that houses the protected images. Thus it may not be possible to generate substitute image data on the computer that houses the protected images.

In a preferred embodiment of the present invention, the protected images are first downloaded to the computer that houses the web page, so that substitute data can be generated at such computer. However, this process is preferably carefully arranged, so as not to compromise the protection of such images. Specifically, the references to the images within the web pages should be disguised in aliases, so that a user cannot identify the protected images and access them by issuing a direct HTTP request to the computer that houses them.

The computer that houses the web page should preferably also contain a table of aliases, for converting image file name aliases into IP addresses and true file names. In this way, a user accessing such a web page can only see aliases for IP addresses of protected images, and cannot access them directly.

Figure 9:
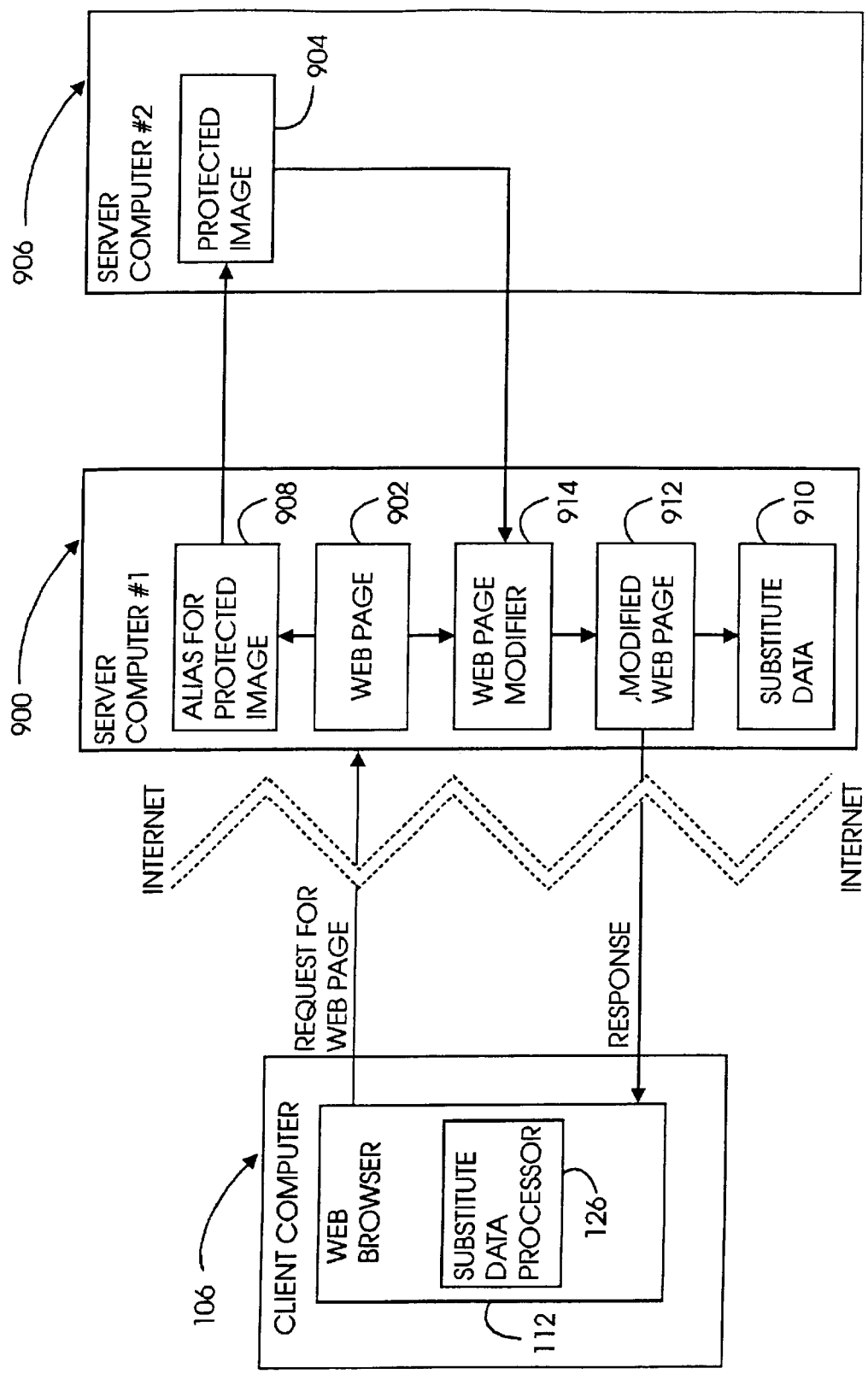
FIG. 9 is a simplified illustration of a system for copyright protection of digital images residing on a computer that are referenced in a web page residing on a different computer.

Reference is now made to FIG. 9, which is a simplified illustration of a system for copyright protection of digital images residing on a computer that are referenced in a web page residing on a different computer. Client computer 106 contains a web browser 112, which issues an HTTP request for a web page from server computer 900. The requested web page, 902, resides on server computer 900 (server computer #1), but it references a protected image 904 that resides on a different server computer 906 (server computer #2). As a result, server computer 900 may not be able to generate substitute data, such as encrypted image data, for protected image 904 until it first downloads protected image 904.

Moreover, in order to protect image 904 from unauthorized access, the reference in web page 902 to image 904 is done through an alias 908. That is, the reference does not specify the IP address and tile file name of image 904; instead, it specifies an alias 908, which only server computer 900 can interpret. In a preferred embodiment of the present invention, server computer 900 maintains a table with entries that convert each alias 908 for a protected image into an IP address and true file name.

When server computer 900 receives the HTTP request for web page 902 from client computer 106, it parses web page 902 and identifies therewithin an image reference with an alias 908. Server computer 900 deciphers alias 908 to determine the IP address and true file name for protected image 904. Server computer 900 downloads protected image 904 from server computer 906, and uses it to generate substitute data 910.

Server computer 900 generates substitute data 910, and generates a modified web page 912 using a web page modifier 914. Web page modifier replaces the reference to the alias 908 within web page 902 by a reference to substitute data 910. Modified web page 912 is sent to client 106 within an HTTP response, and web browser 112 displays modified web page 912 with substitute data 910 embedded therewithin. In a preferred embodiment of the present invention, web browser 112 contains a substitute data processor 126 that is used to render substitute data 910.

Figure 10:
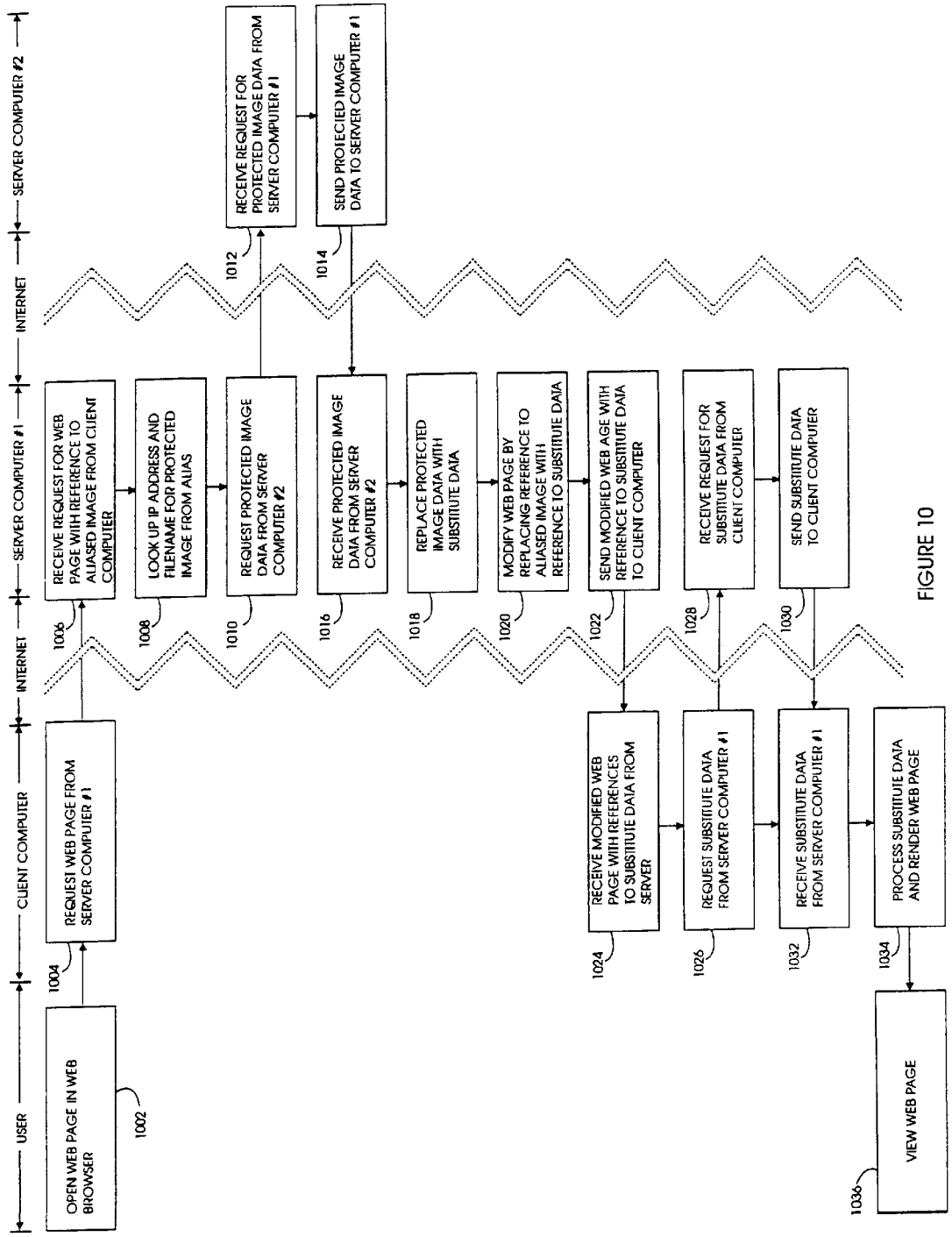
FIG. 10 is a simplified flowchart of a method for copyright protection of digital images residing on a computer that are referenced in a web page residing on a different computer.

Reference is now made to FIG. 10, which is a simplified flowchart of a method for copyright protection of digital images residing on a computer that are referenced in a web page residing on a different computer. The flowchart is divided into f(Oui columns. The leftmost column includes steps performed by a user, the second column from the left includes steps performed by a client computer, the third column from the left includes steps performed by a first server computer (server computer #1), and the rightmost column includes steps performed by a second server computer (server computer #2).

At step 1002 a user opens a URL for a web page in his web browser. At step 1004 the client computer. issues an HTTP request for the web page to server computer #1. At step 1006 the first server computer receives the HTTP request for the web page. The web page references a protected image located on the second server computer, but the protected image is not referenced by name. Rather, the protected image is referenced by an alias. At step 1008 the first server computer looks up the IP address and true file name for the protected image, from a table with entries for mapping aliases to IP addresses and true file names.

At step 1010 the first server computer requests the protected image data from the second server computer. At step 1012 the second server computer receives the request from the first server computer, and at step 1014 the second server computer sends the protected image data to the first server computer. At step 1016 the first server computer receives the protected image data from the second server computer, and at step 1018 the first server computer replaces the protected image data with substitute data. Alternatively, the first server computer may generate substitute data and keep the protected image data intact, or it may use substitute data that is pre-defined image or text data.

At step 1020 the first server computer modifies the web page by replacing references to the aliased image with references to the substitute data. At step 1022 the first computer sends an HTTP response including the modified web page to the client computer. At step 1024 the client computer receives the HTTP response with the modified web page, and begins to render the web page using its web browser. The web browser encounters the reference to the substitute data and, in response, at step 1026 the client computer requests the substitute data from the first server computer. At step 1028 the first server computer receives the request for the substitute data, and at step 1030 the first server computer sends the requested substitute data to the client computer. At step 1032 the client computer receives the substitute data, and at step 1034 the client computer web browser processes the substitute data in order to embed it within the web page. Finally, at step 1036 the user views the requested web page with the image embedded, but without the protected image data having been downloaded to the client computer, and without the identity (i.e., IP address and true file name) of the protected image having been disclosed.

User Interface

FIGS. 11–18 illustrate a user interface for a software management protection tool operative in accordance with a preferred embodiment of the present invention. Such a management protection tool is described hereinabove with reference to FIG. 3 and FIG. 4, and enables an administrator to set protection status for images residing on one or more web server computers.

Figure 11:
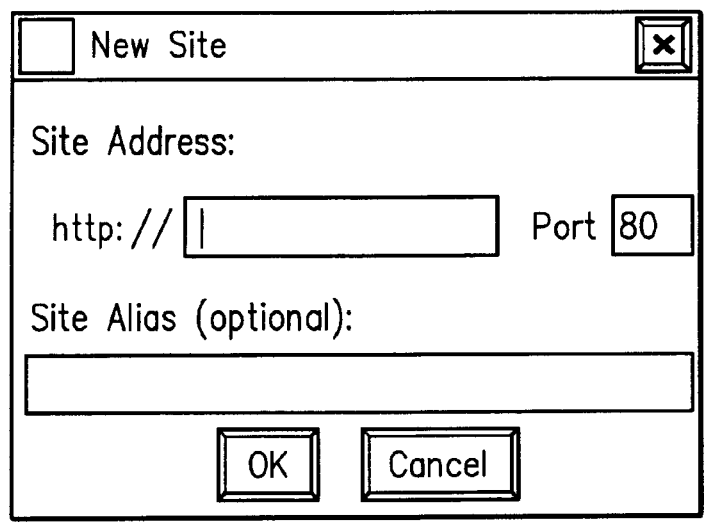
FIG. 11 is an illustration of a user interface dialogue box for adding a new site, within a protection management tool operative in accordance with a preferred embodiment of the present invention.

Reference is now made to FIG. 11, which illustrates a user interface dialogue box for adding a new site, within a protection management tool operative in accordance with a preferred embodiment of the present invention. When a user launches the protection management tool for the first time, a New Site dialogue box, such as the one illustrated in FIG. 11, opens. The New Site dialogue box can also be opened by the user at any later time, whenever he wants to administer a new HTTP site that is not already listed in a site list maintained by the protection management tool, by clicking on the "New Site . . ." button in the Access Site dialogue box illustrated in FIG. 12, or by clicking on the "New . . ." button in the Site List dialogue box illustrated in FIG. 17. The New Site dialogue box prompts the user to identify the new site he wishes to administer by entering an IP address for the site and a port for the site. A default value of 80 for the port is used, since port 80 is the standard HTTP port. The user is also prompted to enter an optional alias for the site, for quick reference.

After entering the site identification data, the user can click on "OK" to add the site to the site list. He can also click on "Cancel" to cancel his entries. Clicking on OK or on Cancel cause the dialogue box to close. The New Site dialogue box can also be closed by clicking on the "X" in the upper right corner of the dialogue box window, as is typically done to close windows in the Windows operating system.

Figure 12:
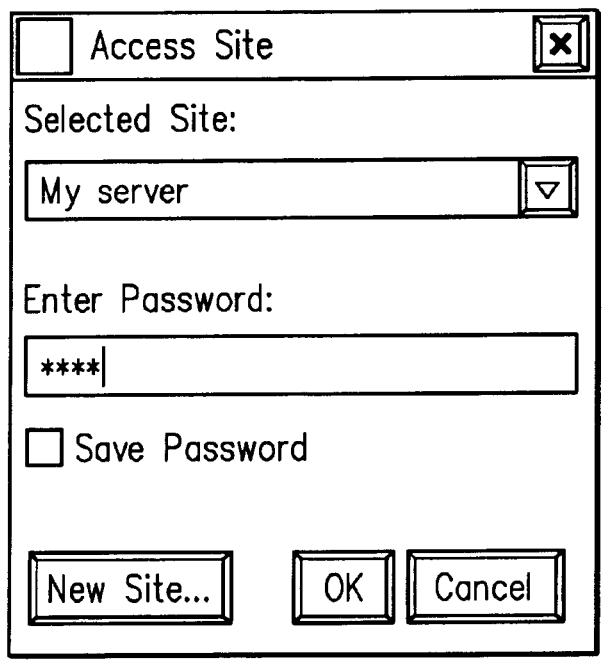
FIG. 12 is an illustration of a user interface dialogue box for accessing a site, within a protection management tool operative in accordance with a preferred embodiment of the present invention.

Reference is now made to FIG. 12, which is an illustration of a user interface dialogue box for accessing a site, within a protection management tool operative in accordance with a preferred embodiment of the present invention. After the user adds a new site to the site list in the New Site dialogue box illustrated in FIG. 11, an Access Site dialogue box, such as the one illustrated in FIG. 12, opens. The Access Site dialogue box can also be opened by the user at any time, whenever he wants to access sites in the site list, by clicking on the "Modify" button in the Site List dialogue box illustrated in FIG. 17. The Access Site dialogue box prompts the user to select a specific site to administer by entering site identification information. For ease of use, the user can click on the down arrow shown at the right, and in response the protection management tool displays a drop-down menu with a list of all sites included in the site list. The user can then select a site from the menu, and the site identification information is automatically entered in the dialogue box.

The Access Site dialogue box also prompts the user to enter a password. The password for a site is first set when copyright protection software is installed on a web server computer. At the time of installation, the web administrator sets an initial password for the web site, together with other server parameters. The web site password can be modified at a later time, as described hereinbelow with reference to FIG. 16.

The user can check the "Save Password" box if he wants the protection management tool to save the password he enters, for automatic use when he subsequently accesses the site. After entering the required data, the user can click the "OK" button to access the site, or he can click the "Cancel" button to cancel his entries. Clicking on OK or on Cancel cause the dialogue box to close. The Access Site dialogue box can also be closed by clicking on the "X" in the upper right corner of the dialogue box window, as is typically done for windows in the Windows operating system.

Figure 13:
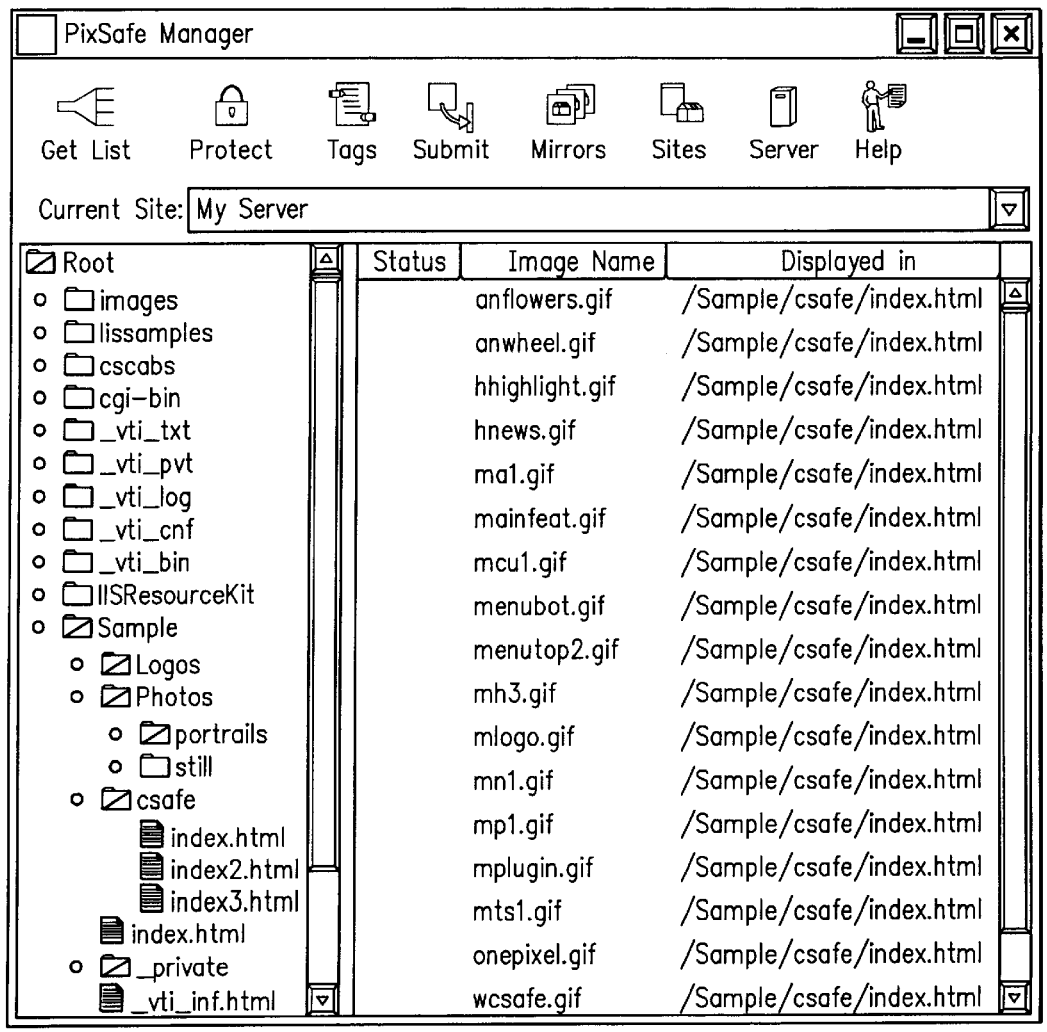
FIG. 13 is an illustration of a user interface screen for setting protection status, within a protection management tool operative in accordance with a preferred embodiment of the present invention.

If the user clicks the "OK" button then his password is authenticated. If the password is correct, the user is granted access to the site, and the main screen illustrated in FIG. 13 is opened. If the password is incorrect, the user is so notified and given a limited number of tries to enter the correct password. In an alternate embodiment of the present invention, the user may be given an unlimited number of tries to enter the correct password.

The Access Site dialogue box also enables the user to open the New Site dialogue box illustrated in FIG. 11, by clicking on the "New Site . . ." button.

Reference is now made to FIG. 13, which is an illustration of a user interface screen for setting protection status, within a protection management tool operative in accordance with a preferred embodiment of the present invention. The screen illustrated is an Explorer-type screen, with a left panel displaying hierarchical folder information and a right panel displaying image file information. At the left of each displayed folder name is a folder icon, color-coded to indicate the protection status (unprotected/partially protected/completely protected) of the folder, as described hereinabove.

The toolbar at the top of the screen indicates that the leftmost button, "Get List", is selected. A description of the toolbar is provided hereinbelow with reference to FIG. 14. The file name "index.html" of an HTML page that is in the folder /Sample/csafe is highlighted in the left panel of FIG. 13. The image files referenced within index.html are displayed in the right panel. As shown, they are files for GIF images. The "Status" column within the right panel indicates that none of the images listed in the panel are protected, since no protection icons appear. The protection management tool enables the user to select one or more of the listed images for setting protection. The user selects one or more images by clicking on their file names with the mouse, and using the "Shift" and "Control" keys to select a contiguous group of names or multiple names, respectively, as is the well-known standard for Windows operating systems. After selecting one or more images, the user clicks on the "Protect" button to have protection settings applied thereto.

In a preferred embodiment of the present invention, the "Protect" button toggles the current protection settings, so that images that are unprotected become protected, and images that are protected become unprotected. In an alternate embodiment of the present invention, the user interface may not permit a user from selecting at one time both images that are protected and images that are unprotected, so that each application of protection settings either sets the status of unprotected images to protected or sets the status of protected images to unprotected.

As described hereinabove, the user can select one or more HTML files, to apply protection settings to all images referenced therein. The user can also select one or more folders, to apply protection settings to all images located therein. By navigating through the file system, the user can browse the web site being administered with the screen of FIG. 13, and select folders, HTML pages and other types of web pages, and images to protect or to unprotect.

Figure 14:
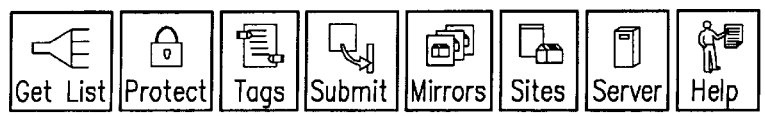
FIG. 14 is an illustration of a tool bar within a protection management tool operative in accordance with a preferred embodiment of the present invention.

Reference is now made to FIG. 14, which is an illustration of a tool bar within a protection management tool operative in accordance with a preferred embodiment of the present invention. The tool bar illustrated in FIG. 14 is the one appearing at the top of the screen illustrated in FIG. 13. It contains eight buttons, entitled "Get List", "Protect", "Tags", "Submit", "Mirrors", "Sites", "Server" and "Help". The "Get List" button is used to browse the web site being administered using the screen illustrated in FIG. 13 hereinabove. The "Protect" button is used to apply protection settings to one or more selected images, as described hereinabove with reference to FIG. 13.

The Tags button can be used when a user selects one or more HTML page file names, to protect images referenced within protection tags in the selected HTML pages. As described hereinabove, tags such as <!protect> and <!/protect> are used to delineate one or more sections within an HTML page, and the images referenced within the tagged sections can be protected by selecting the HTML file name and clicking on the "Tags" button. In distinction to the Protect button which serves to protect all of the images within selected HTML pages, the "Tags" button only protects images reference within the tagged sections of selected HTML pages.

The "Submit" button is used to confirm protection settings made by the user, and transmit them to the web server computer for application. When the user clicks on the "Submit" button, the protection settings he edited are sent to the web server computer and incorporated into the protection status database, as described hereinabove with reference to FIG. 3 and FIG. 4. Until the user clicks on the "Submit" button, the protection settings he edited are only displayed within the protection management tool by his local computer. Only when he clicks the "Submit button" are his settings actually applied. If the user does not click on the "Submit" button, then all of the protection settings he edited will not take effect, and the protection settings will remain at their former state if he closes the screen.

The "Mirrors" button is used to identify web sites that are mirror sites (i.e., identical sites), as described hereinbelow with reference to FIG. 18. The "Site" button is used for updating the list of administered sites, as described hereinbelow with reference to FIG. 17. The "Server" button is used to modify server parameter settings, as described hereinbelow with reference to FIG. 15. The server parameters are first initialized when the copyright protection software is installed on the web server computer.

The "Help" button is used to invoke on-line help and documentation, as is typical for Windows applications.

Figure 15:
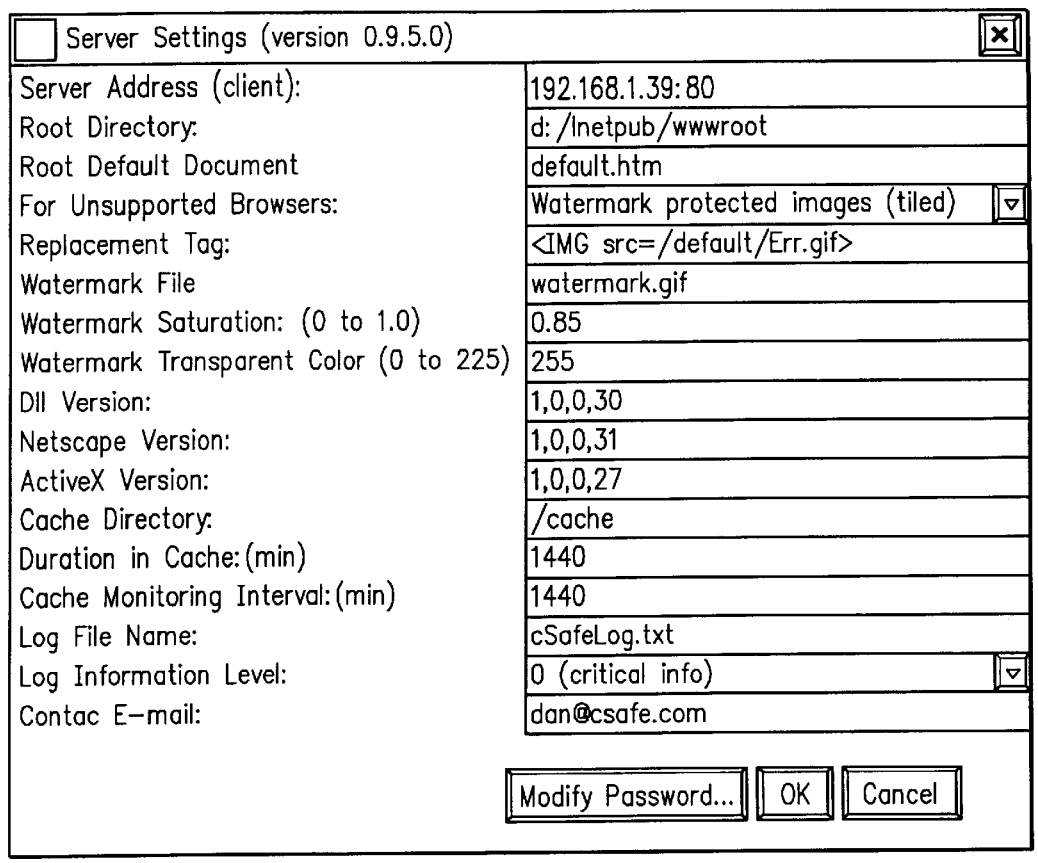
FIG. 15 is an illustration of a user interface dialogue box for setting server parameters within a protection management tool operative in accordance with a preferred embodiment of the present invention.

Reference is now made to FIG. 15, which is an illustration of a user interface dialogue box for setting server parameters within a protection management tool operative in accordance with a preferred embodiment of the present invention. A Server Settings dialogue box is invoked when a user clicks on the "Server" button in the tool bar illustrated in FIG. 14.

The topmost parameter is the IP address for the web server. The parameter setting indicated in FIG. 15 specifies an IP address of 192.168.1.39 and a port of 80. The second parameter is the root directory for the web server, relative to which folder names and file names are specified. The parameter setting indicated in FIG. 15 specifies a root directory of d:/Inetpub/wwwroot. The third parameter is the file name of a default web page that is displayed when a client first connects to the web server. The parameter setting indicated in FIG. 15 specifies a default web page default.htm (residing in the root directory).

The fourth parameter specifies what is to be performed when a protected image is requested by an unsupported web browser. An unsupported web browser is one for which a substitute data processor, such as the one indicated in FIG. 1, is not installed. For such a browser the web server cannot send substitute data, such as encrypted image data, since the browser will not be able to render it. Instead, the web server must send an image in a standard format such as JPEG and GIF, which the browser can render.

In a preferred embodiment, the protection management tool offers three options for dealing with unsupported browsers: (i) allow protected images to be transmitted without protection; (ii) replace tags for protected images with alternate HTML tags; and (iii) watermark protected images. The fourth parameter specifies which of these three options the user chooses. The parameter setting indicated in FIG. 15 specifies the third option; namely, that tiled watermarks are to be composited onto the protected image, and the resulting watermarked image is to be transmitted instead of the protected image itself. Preferably, this is the default parameter setting. The watermarked image is transmitted in a standard image format, such as JPEG and GIF, and, as such, it can be displayed by the web browser.

The fifth parameter indicates the replacement tag to be substituted for a reference to a protected image in an HTML page, when the client is using an unsupported browser and when the second option above is chosen for handling unsupported browsers. The parameter setting indicated in FIG. 15 specifies that the replacement tag to be used is an IMG tag with a source file name of /default/Err.gif. Preferably, this is the default parameter setting.

The sixth parameter indicates the image of a watermark to be used for watermarking protected images, when the client is using an unsupported browser and when the third option above is chosen for handling unsupported browsers. Typically, the watermark image is a small image, and it is tiled so that the watermark appears repetitively in a checkerboard fashion, or other such fashion, over a protected image that is watermarked. The parameter setting indicated in FIG. 15 specifies that the watermark image is in a file named watermark.gif. The seventh parameter indicates the saturation, or opacity level, with which the watermark is to be composited over a protected image, when the client is using an unsupported browser. A saturation of 0.0 is fully transparent, and a saturation of 1.0 is fully opaque. The parameter setting indicated in FIG. 15 specifies a saturation level of 85%. Preferably, this is the default parameter setting. The eighth parameter indicates a transparent color for the watermark; i.e., a color to be treated as background and not changed by the watermark. This ensures that backgrounds of protected images are not watermarked. The parameter setting indicated in FIG. 15 indicates a watermark transparent color of white (255). Preferably, this is the default parameter setting.

The next three parameters are disabled so that they cannot be edited. They indicate the DLL version of the copyright protection software, the Netscape version and the ActiveX version, respectively.

The twelfth parameter indicates the directory in which substitute data, such as encrypted images, are cached for efficient re-use upon subsequent requests for the same protected images. The parameter setting indicated in FIG. 15 indicates the directory/cache (relative to the root directory d:/Inetpub/wwwroot). The thirteenth parameter indicates the length of time during which a file is maintained in the cache directory. The parameter setting indicated in FIG. 15 indicates a duration of 1,440 minutes. After this duration a cached file is purged from the cache. The fourteenth parameter indicates the frequency with which the cache is monitored, to determine which files are to be purged from the cache. The parameter setting indicated in FIG. 15 indicates a monitoring frequency of every 1,440 minutes.

The fifteenth parameter indicates a file name into which a logy file is written. The parameter setting indicated in FIG. 15 indicates a file name of cSafeLog.txt. This file will receive log data for the copyright protection software running on the server. The log data may include information such as requests for protected image data, the clients making the requests and the data transmitted to them in response. The sixteenth parameter indicates the level of detail to be written to the log file. Level zero corresponds to the minimum of detail—only critical information, and higher levels correspond to additional detail.

The seventeenth parameter indicates the e-mail address of the administrator of the web server computer, to be contacted as necessary. For example, the administrator can be contacted whenever there is upgraded copyright protection soltware available, or whenever new products are available.

After setting values for the server parameters, the user can click on the "OK" button to apply the new parameter settings. The user can also click on "Cancel" to cancel his entries. If the user wishes to modify the password for the server, he can click on the "Modify Password" button, which opens the "Modify Password" dialogue box, as described with reference to FIG. 16.

Figure 16:
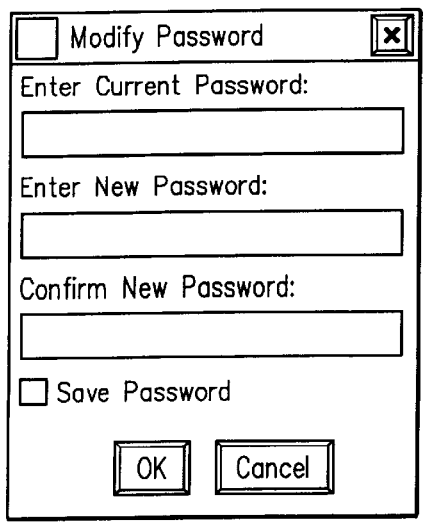
FIG. 16 is an illustration of a user interface dialogue box for modifying a password for accessing a web server, within a protection management tool operative in accordance with a preferred embodiment of the present invention.

Reference is now made to FIG. 16, which is an illustration of a user interface dialogue box for modifying a password for accessing a web server, within a protection management tool operative in accordance with a preferred embodiment of the present invention. A Modify Password dialogue box is invoked when a user clicks on the "Modify Password" button in the Server Settings dialogue box illustrated in FIG. 15. The Modify Password dialogue box prompts the user for the typical information used when changing a password. The user is prompted to enter the current password, the new password and a confirmation of the new password. The user may also check a box indicating that the password is to be saved by the protection management tool, so that the user can subsequently access the web site without having to specify the password again (as long as the password remains valid). After providing the requested passwords, the user can click on the "OK" button to effectuate his change. He can also click on the "Cancel" button to cancel his entries.

In a preferred embodiment of the present invention, the protection management tool sets a maximum expiration date for a password, thus forcing the user to update his password from time to time.

Figure 17:
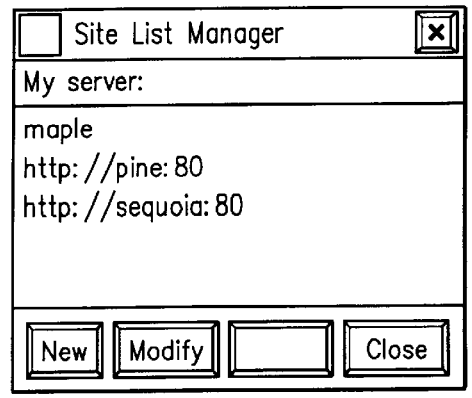
FIG. 17 is an illustration of a user interface dialogue box for a site list, within a protection management tool operative in accordance with a preferred embodiment of the present invention.

Reference is now made to FIG. 17, which is an illustration of a user interface dialogue box for a site list, within a protection management tool operative in accordance with a preferred embodiment of the present invention. The "Site List" dialogue box is invoked when a user clicks on the "Sites" button in the tool bar illustrated in FIG. 14. The Site List dialogue box lists all of the sites included in the site list used by the protection manager tool. The sites are listed by alias name, or by IP address for those sites that do not have an alias.

A user can add a new site to the list by clicking on the "New . . ." button. A user can modify the settings for a site already included in the list by clicking on the "Modify . . ." button. A user can delete sites from the site list by selecting one or more sites listed in the dialogue box, and clicking on the "Delete" button. The "Delete" button is shown disabled in FIG. 17, since none of the sites listed are selected. The user closes the Site List dialogue box by clicking on the "Close" button or on the "X" at the top right corner of the dialogue box window.

Figure 18:
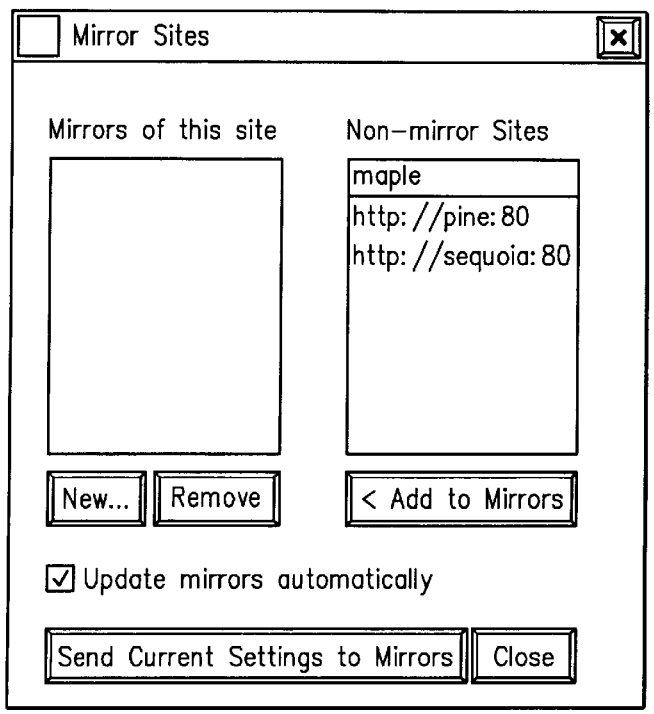
FIG. 18 is an illustration of a user interface dialogue box for defining mirror sites, within a protection management tool operative in accordance with a preferred embodiment of the present invention.

Reference is now made to FIG. 18, which is an illustration of a user interface dialogue box for defining mirror sites, within a protection management tool operative in accordance with a preferred embodiment of the present invention. Mirror sites are identical web sites, used for the purpose of proliferating files on multiple server computers, so as to balance the processing load over multiple computers, and so as to make it easier for users around the world to access files. It is the responsibility of web administrators to ensure that mirror sites are kept current.

In a preferred embodiment of the present invention, protection settings edited by a user for a specific web site can be applied to one or more mirror sites as well, without the need for the user to explicitly edit the settings on each individual mirror site. The protection management tool preferably enables a user to identify sites that are mirror sites, and manage their protection settings simultaneously. A Mirror Sites dialogue box is invoked when a user clicks on the "Mirrors" button in the tool bar illustrated in FIG. 14. The Mirror Sites dialogue box is invoked while a user is accessing a specific site, and the information it displays is relative to this specific site currently being accessed.

As shown in FIG. 18, the Mirror Sites dialogue box has a left panel indicating sites from among the site list that are mirrors of the site being accessed, and a right panel indicating sites from the site list that are not mirrors of the site currently being accessed. The user can click on one or more of the sites listed in the right panel to select them, and then click on the "<Add to Mirrors" button to make them mirror sites of the site being accessed. Clicking on the "<Add to Mirrors" button results in the selected sites being moved from the right panel to the left panel.

The user can click on the "New . . ." button if he wishes to include a new site, not currently included in the site list, as a mirror site to the site currently being accessed. The user can also select one or more of the sites listed in the left panel as mirror sites, and click on the "Remove" button to make them non-mirror sites. The "Remove" button is disabled in FIG. 18, since no sites are shown listed as mirror sites in the Figure. Clicking on the "Remove" button results in the selected sites being moved from the left panel to the right panel.

The user can check a box to update mirrors automatically, and then any edits he makes to parameter settings for the site currently being accessed will automatically be submitted to the mirror sites whenever the user clicks on the "Submit" button in the tool bar illustrated in FIG. 14, to submit his edits to the web server computer. This mode of automatic update results in protection settings being updated incrementally in mirror sites each time the user edits them in one of the sites. However, if one or more edits are not synchronized with mirror sites, the mirror sites will lose synchronization and will not regain synchronization as future edits are made, even if the future edits are proliferated to the mirror sites. This loss of synchronization can happen, for example, if one of the mirror sites is not operational at the time the user makes his edits to the protection settings or, for example, if a mirror site is removed from the list of mirror sites.

In order to bring mirror sites up-to-date with a site currently being accessed, the Mirror Sites dialogue box also has a button for sending the current settings to the mirror sites. Clicking on this button causes all of the protection settings to be sent to the mirror sites listed in the left panel, and not merely the incremental edits that the user made. This serves to re-synchronize the mirror sites with the site currently being accessed, and ensures that the protection settings are the same at the mirror sites and the site currently being accessed.

Sending all of the protection settings to mirror sites typically requires a lot of bandwidth. If only a few of the mirror sites need to be re-synchronized, the user can temporarily move the other mirror sites from the left panel to the right panel, send the current protection settings to re-synchronize the mirror sites remaining in the left panel, and then move the other mirror sites from the right panel back to the left panel. This reduces the number of sites to which the protection settings have to be transmitted. The Mirror Sites dialogue box can be closed by clicking on the "Close" button, or by clicking on the "X" at the upper right hand corner of the dialogue box window.

Figure 19:
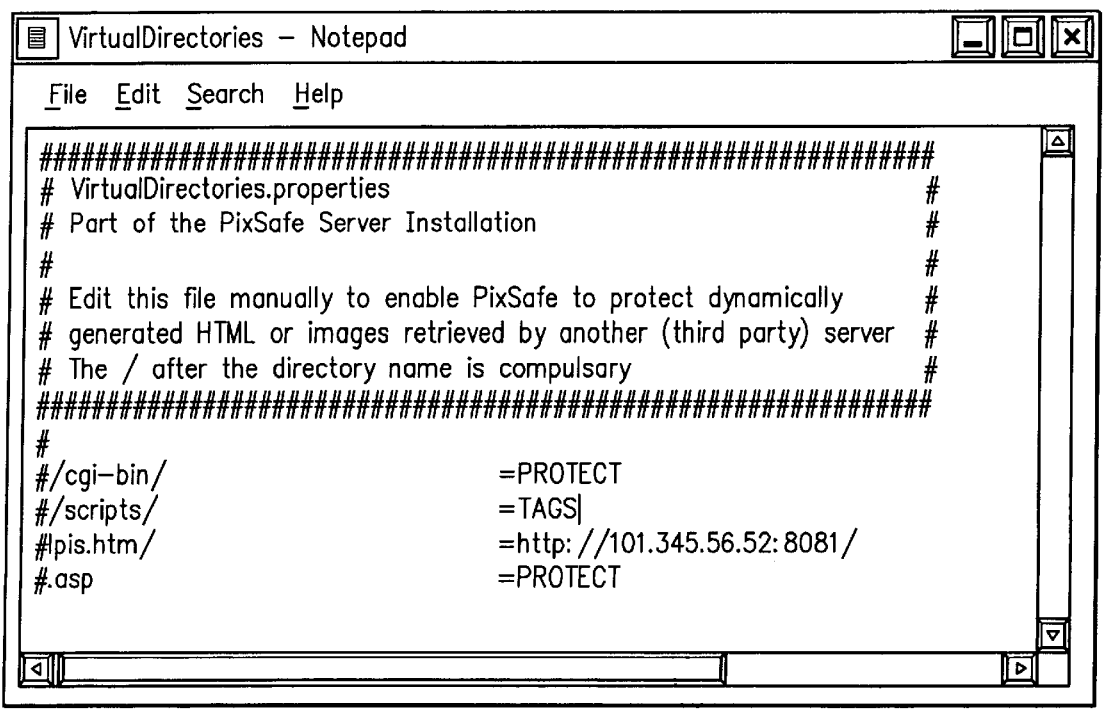
FIG. 19 is an illustration of a virtual directory properties file residing on a web server computer in accordance with a preferred embodiment of the present invention.

Reference is now made to FIG. 19, which is an illustration of a virtual directory properties file residing on a web server computer in accordance with a preferred embodiment of the present invention. The virtual directories property file is a text file named VirtualDirectories.properties, preferably used by the web server to (i) protect images in dynamically generated web pages, and (ii) protect images residing on other server computers. This file contains the names of directories in which dynamically generated pages and/or dynamically generated images are stored, along with a protection status identifier for such directories. Protection status identifiers include PROTECT, TAGS and ACCESSIBLE. PROTECT indicates that the pages and images in the directory are protected. TAGS indicates that only images referenced within protect tags of HTML pages in the directory are protected. ACCESSIBLE indicates that the pages and images in the directory are unprotected.

The file illustrated in FIG. 19 indicates that a directory named /cgi-bin/ (relative to the root directory) is assigned PROTECT status. Thus pages and images in /cgi-bin/ that are dynamically generated will be protected. FIG. 19 also indicates that a directory named /scripts/ (relative to the root directory) is assigned TAGS status. Thus pages in /scripts/ that are dynamically generated will be protected to the extent that images referenced within their protect tags are protected.

FIG. 19 also indicates an alias for images on another server computer that are to be protected. The alias is /lpis.htm?, and the true address is http://101.345.56.52:8081/. Thus /lpis.htm and /lpis.html are interpreted by the web server as aliases for the root directory of the web server with IP address 101.345.56.52 and port 8081.

The VirtualDirectories.properties file is manually or automatically edited by a user whenever he wishes to protect dynamically generated web pages, dynamically generated images, and images residing on another server computer.

Implementation Details

In a preferred embodiment of the present invention, when the client web browser has installed a substitute data processor such as a Netscape SmartUpdate or plug-in, or an Internet Explorer ActiveX control, as indicated in FIG. 1, the substitute data used for protected images are encrypted images. That is, (i) protected images are encrypted on the web server computer, using an encryption algorithm and an encryption key as is well known to those skilled in the art; (ii) references to the protected images are replaced with references to encrypted images in the HTML pages that reference the protected images, and (iii) the encrypted images are transmitted from the web server to client computers. The client computers use substitute data processing software to decode the encrypted images and to render them for display on a video monitor.

In order for this to work, it is necessary for the substitute data processor on the client computer to know the encryption algorithm being used by the web server and the encryption key. This presents a potential security hole, in that someone could decipher this encryption information from the substitute data processor by reverse engineering, and use it for stealing copyright protected images.

In a preferred embodiment of the present invention, the web server regularly changes the encryption key, and possibly also the encryption algorithm. When each such change is made, the server computer transmits updated substitute data processing software to each registered client computer, as soon as such client computer connects to the server. This ensures that the encryption key, and possibly also the encryption algorithm, are changed regularly, thus thwarting attempts to steal copyright protected images by reverse engineering substitute data processors. Preferably these updates are done frequently enough so that the duration between updates is likely to be less than the time it typically takes to discover the encryption information by reverse engineering.

In a preferred embodiment of the present invention, each client that downloads a substitute data processor from a server computer is registered in a user database. This makes it possible to keep track of clients and send them updated software automatically. Alternatively, version information for a substitute data processor in a client computer may be stored in a "cookie," or other such file used by web servers to identify client information. Using the cookie, a web server can automatically determine if a client is using outdated software, and, if so, automatically update the client software. Yet another alternative is for the web server to do nothing, in which case the client software will no longer be able to render encrypted images after the encryption key and/or algorithm is updated, and the user will have to download updated software at his own initiative.

What follows is a detailed description of a preferred embodiment of the present invention, as it operates to block screen capture utilities within a Macintosh operating system.

For the Macintosh operating system, a plugin for Netscape and Internet Explorer is preferably used. The plugin consists of three parts—the plugin proper, a system extension (also referred to as INIT) and an executable client library. The system extension and the client library are downloaded from a web server as needed, as described hereinbelow.

The plugin is preferably placed in the Netscape or Internet Explorer Plugins folder. The system extension and the client library are preferably installed into the Extensions Folder in the System folder of the user's boot disk. The system extension is an invisible file, and contains an INIT resource that "patches" system calls at boot time as needed, in order to enable the plugin to circumvent screen capture programs.

Preferably, the system extension does not do processing itself, but instead calls the plugin, which in turn sends a patch through to the client library. The client library is preferably a MacOS shared library, and contains programming code for patches and for rendering images onto a screen. The provides the capability to update code without downloading the entire plugin.

In order to view protected images, a user is first required to download the plugin and INIT. A user then runs an installation program to install the plugin into the Netscape Navigator Plugins folder or the Internet Explorer Plugins Folder. The user reboots his computer in order for the INIT to apply its system patches.

When the plugin is activated, it preferably reads a configuration file to determine if the client library or system extension needs up be updated. If the configuration file is missing, or if the current date and time is greater than the next update check time in the configuration file, the plugin downloads a new configuration file that specifies the latest version of the client library and the system extension. If the current version of the client library and/or the system extension on a client computer is not the latest version, then the plugin downloads the latest version of the client library and/or the system extension.

Preferably the configuration file includes (i) a date for next update check, (ii) a client library version number, (iii) a system extension version number, (iv) a list of capture application types, (v) a list of capture control panels and extensions, (vi) a list of resource types. and (vii) a list of non-blockable control panels and extensions.

The format for the date is of the form:
Wed. Aug. 18 13:22:04 1999

The version numbers are preferably in MacOS binary coded decimal version format, of the form:
M.m.b.srr
  where M is the major version number, m is the minor version number, b is the bug fix number, s is the stage (d, a, b or f) and rrr is the release number.

Except for the list of resource types, all list entries have the following three-line structure:
  Line 1—Name of utility/application Line 2—4 character file type, 4 character creator type, 4 character resource type (packed)
  Line 3—hex characters of pattern to match Line 1 includes the name of the utility. This line is preferably only used by the list of non-blockable control panels and extensions. For other lists, the name "Unused" is inserted. Line 2 contains three 4-character codes used to identify capture applications and utilities. The first two codes are the file type and creator type, and the third code is a resource type. Line 3 contains hex codes for a pattern to match in the resource map of the file. If no hex pattern is used, a single carriage return is included.

An example of a configuration file is as follows:
Wed. Aug. 18 13:22:04 1999
1.0.0a2
1.0.0a2
CaptureAppsBegin
Unused
APPLc2gfc2gf
Unused
APPLCmApCmAp
43616D6572614D616E
Unused
APPLLu§>>Lu§>>
Unused
APPLSnpTSnpT
536E617073686F7420496E666F
Unused
APPLSNAPSNAP
53637265656E536E6170
CaptureAppsEnd
CaptureUtilsBegin
Unused
CdevSnp2Snp2
536E61707A
Unused
CdevshOTshOT
53637265656E53686F74
Unused
CdevexPRexPR
4578706F737572652048657973
Unused
CdevCaptCapt
CaptureUtilsEnd
ResTypesBegin
STR#

ShOT
ShOT
ShOT
CURS
ResTypesEnd
AbortTypesBegin
Appletalk Control Panel
Cdevatdvatdv
6B5377697463684170706C6574616C6B444C4F47
AbortTypesEnd When it encounters a file name, the web browser normally identifies a type of content, and pushes the file to all appropriate plugin. However, in the present invention the parameters passed to the plugin provide only encrypted names for protected image files, and, as such, the web browser typically cannot determine a content type from the file name. Instead, the plugin decrypts the name and initiates the download itself. This prevents others from accessing protected images directly. Downloaded protected image files are encrypted, and the library decrypts them before they are used.

MacOS uses file types and creator types to identify files and the applications that created them. The list of capture applications from the configuration file is used by the plugin in conjunction with creator types to determine relevant applications to be aware of for ensuring copyright protection. If such a capture application is launched or running, the plugin preferably hides its images.

Similarly, the list of capture control panels and extensions from the configuration file is used by the plugin in conjunction with the list of resource types to determine if a non-application executable, such as an extension or control panel, is about to invoke a screen capture.

The system extension loads itself into memory at boot time. It looks in the System Folder, Extensions Folder, Control Panels Folder and the Start Up Items folder, for items of type INIT, cdev, APPC, appe and APPL, which are INITs, control panels, new control panels, applications and application extensions. For each of these folders, the system extension creates an information list that includes a copy of the resource map for each such item found. The information list is used by the plugin to locate "show stoppers;" i.e., utilities that cannot be blocked by known methods.

The system extension patches the following traps: OpenPicture, ClosePicture, CopyBits, InitGraf, GetResource and SetFileInfo.

A typical way for a capture utility to implement screen capture is by creating a MacOS Picture, similar to a Windows meta-file. Such a capture utility calls OpenPicture( ), CopyBits(screen,dest) and ClosePicture( ), to create a PICT tile or to put the data on the global clipboard in PICT format. If the plugin is running, the system extension patch for OpenPicture( ) sets a flag so that the system extension patch for CopyBits( ) knows that OpenPicture( ) was previously called.

The system extension patch for CopyBits( ) is preferably a head patch; i.e., the patch is applied and then the conventional system CopyBits( ) is called. The system extension patch for OpenPicture( ) preferably calls the plugin to update rectangles of the instances, and to set a flag to indicate to the system extension that the patch for CopyBits( ) should be used. The system extension patch for CopyBits( ) uses the rectangles and erases them on screen, so that the conventional CopyBits( ) call does not gain access to unmodified protected images. The patch for CopyBits( ) sets a flag indicating that the plugin should re-draw the images.

Preferably, the plugin identifies screen capture utilities using two methods: (i) by file type and creator, and (ii) by the resource map of the file. When used together, these two methods provide a more robust way to identify files than does either of them alone. A Macintosh file includes two forks—a resource fork, and a data fork. The resource fork includes data that can be changed independently of the executable code; for example, strings, icons and dialogue boxes.

When the resource fork for a file is opened, an index of the fork, referred to as a resource map, is read into RAM by the resource manager. The resource map includes information about resources in the file. Resource maps are chained in a linked list—as each file in the chain is opened, a new map is added to the chain. A descriptor for the creator of a file is typically stored in a signature resource in the file. The signature resource is part of a group of resources that enables the operating system to associate icons and files with the creator type. This information can be used by a patch for GetResource( ) to identify a screen capture utility that is running. The resource map can be searched for the signature resource. If it can be found, then the capture utility can be identified.

The resource type (the third 4-character code in line 2) can also be used to identify a screen capture utility. The hexadecimal string (line 3) can also be used.

It is noted that the resource map cannot be used during idle time to identify capture utilities that are applications. The reason for this is that when the plugin is trying to identify capture applications during idle time, the resource map for the capture application is not in an available chain. To overcome this, the present invention preferably uses the system extension patch for InitGraf( ) to grab application resource maps as each application is launched. When the system extension starts up, it allocates a table to store 512 resource maps. When an application is launched, the patch for InitGraf( ) is called, and the system extension stores the current resource map in one of the 512 entries. When the application is closed, the resource map is removed from the table. The table is accessible to the plugin, and when the plugin is running it examines the table to see if there is a signature resource or other identifying trait. If so, then the plugin call determine if a capture application is running, and can hide protected images. The choice of 512 for the size of the table for the resource maps is arbitrary, but has been found to be adequate.

Because searching for utilities installed on a client computer is time consuming, the system extension preferably does the search at startup time, and stores information about each INIT, cdev, APPC, appe and APPL file type in the System Folder, Extensions Folder, Startup Folder and Control Panels folders If instead the plug in was to do the search, then the search would have to be carried out each time the plugin is instantiated.

The system extension makes the information about the extensions and control panels available to the plugin via shared memory, and the plugin can quickly scan the list for installed items that cannot be blocked.

Additional Considerations

In reading the above description, persons skilled in the art will realize that there are many apparent variations that can be applied to the methods and systems described. For example, although the present invention has been described with respect to digital images, it applies to copyright protection of other forms of multi-media referenced in web pages as well, such as audio files, video files and slide shows. In each case, substitute data can be used so that a user can play or view the multi-media within the web page without downloading an unmodified version of it into his computer.

For another example, the present invention can be applied to copyright protection of text contained in web pages. Currently, text contained in web pages can be copied by simply selecting a section of text by dragging a mouse pointer thereover, and invoking a "Copy" command. The copied text can then be pasted onto a word processing application by invoking a "Paste" command.

By converting the text data into one or more images and designating the one or more images as being protected, the present invention can be used to prevent unauthorized copying of text from a web page.

For another example, the present invention can be integrated with transaction software so that protected images can be purchased on-line. Specifically, when a user positions a mouse pointer over a protected image and right clicks on the mouse, a transaction menu can be popped up with one or more selections for purchasing the protected image. Selecting an option to purchase the image can trigger e-commerce transaction software. Thus when a user tries to save the image using the standard "Save Image As . . ." command, he is notified that the image is copyright protected and presented with an opportunity to purchase the image. Selections for purchasing the image can include purchasing one or more hardcopy prints of the image, purchasing apparel, such as clothing, containing the image, and purchasing an electronic version of the image.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for protecting digital images displayed in a web browser, comprising:
 displaying a digital image by a web browser, the digital image comprising pixel data;
 requesting access to pixel data of the digital image, by invoking a Macintosh ToolBox function for accessing pixel data; and
 blocking access to the pixel data of the digital image, by causing program logic of the Macintosh ToolBox function to jump to logic for substitute instructions that modify the pixel data of the digital image.

2. A method for protecting digital images displayed in a web browser, comprising:
 displaying a digital image by a web browser, the digital image comprising pixel data;
 requesting access to pixel data of the digital image, by invoking an operating system function for accessing pixel data; and
 blocking access to the pixel data of the digital image, by changing a pointer pointing to the operating system function to point to a substitute function.

3. The method of claim 2 wherein the pointer is an entry within a Macintosh Trap Dispatch Table.

4. The method of claim 3 wherein the substitute function is a patched Macintosh ToolBox function.

5. A method for protecting digital images displayed in a web browser, comprising:
 displaying a digital image by a web browser, the digital image comprising pixel data;
 requesting access to pixel data of the digital image, by invoking a Windows BitBlt function for accessing pixel data; and
 blocking access to the pixel data of the digital image, by executing a substitute function with the same name as that of the Windows BitBlt function.

6. A method for protecting digital images displayed in a web browser, comprising:
 displaying a digital image by a web browser, the digital image comprising pixel data;
 requesting access to pixel data of the digital image, by invoking an operating system function for accessing pixel data; and
 blocking access to the pixel data of the digital image, by executing a function with the same name as that of the operating system function.

7. A system for protecting digital images displayed in a web browser, comprising:
 a web browser displaying a digital image, the digital image comprising pixel data;
 a command processor requesting access to pixel data of the digital image by invoking a Macintosh ToolBox function for accessing pixel data;
 a pixel data modifier modifying pixel data of the digital image; and
 a request blocker, blocking access to pixel data of the digital image requested by said command processor by causing program logic of the Macintosh ToolBox function to jump to logic for substitute instructions that invoke said pixel data modifier.

8. A system for protecting digital images displayed in a web browser, comprising:
 a web browser displaying a digital image, the digital image comprising pixel data;
 a command processor requesting access to pixel data of the digital image by invoking an operating system function for accessing pixel data;
 a pixel data modifier modifying pixel data of the digital image; and
 a request blocker, blocking access to pixel data of the digital image requested by said command processor by changing a pointer pointing to the operating system function to point to a substitute function.

9. The system of claim 8 wherein the pointer is an entry within a Macintosh Trap Dispatch Table.

10. The system of claim 8 wherein the substitute function is a patched Macintosh ToolBox function.

11. A system for protecting digital images displayed in a web browser, comprising:
 a web browser displaying a digital image, the digital image comprising pixel data;
 a command processor requesting access to pixel data of the digital image by invoking a Windows BitBlt function for accessing pixel data;
 a pixel data modifier modifying pixel data of the digital image; and
 a request blocker, blocking access to pixel data of the digital image requested by said command processor by executing a substitute function with the same name as that of the Windows BitBlt function.

12. A system for protecting digital images displayed in a web browser, comprising:
 a web browser displaying a digital image, the digital image comprising pixel data;
 a command processor requesting access to pixel data of the digital image by invoking an operating system function for accessing pixel data;

a pixel data modifier modifying pixel data of the digital image; and a request blocker, blocking access to pixel data of the digital image requested by said command processor by executing a function with the same name as that of the operating system function.

* * * * *

UNITED STATES PATENT AND TRADEMARK OFFICE
CERTIFICATE OF CORRECTION

PATENT NO.        : 6,298,446 B1
APPLICATION NO.   : 09/397331
DATED             : October 2, 2001
INVENTOR(S)       : Daniel Schreiber and Andrew Goldman Page 1 of 1

It is certified that error appears in the above-identified patent and that said Letters Patent is hereby corrected as shown below:

Title page add -

Foreign Application Priority Data item (30)

Nov. 16, 1998   (IL) .......................................... 127093
Dec. 30, 1998   (IL) .......................................... 127869
Jun. 14, 1998   (IL) .......................................... 124895

Signed and Sealed this

Twenty-seventh Day of September, 2011

David J. Kappos
*Director of the United States Patent and Trademark Office*